United States Patent
Tian et al.

(10) Patent No.: US 12,423,098 B2
(45) Date of Patent: Sep. 23, 2025

(54) DATA PROCESSING METHOD AND APPARATUS, PROCESSOR, AND NETWORK DEVICE

(71) Applicant: Huawei Technologies Co., Ltd., Shenzhen (CN)

(72) Inventors: Taixu Tian, Dongguan (CN); Weihua Li, Dongguan (CN); Shunfang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 18/483,231

(22) Filed: Oct. 9, 2023

(65) Prior Publication Data
US 2024/0118890 A1    Apr. 11, 2024

(30) Foreign Application Priority Data

Oct. 10, 2022   (CN) .......................... 202211238017.1
Dec. 21, 2022   (CN) .......................... 202211649905.2

(51) Int. Cl.
*G06F 9/30*     (2018.01)
*G06F 7/57*     (2006.01)

(52) U.S. Cl.
CPC .............. *G06F 9/3001* (2013.01); *G06F 7/57* (2013.01)

(58) Field of Classification Search
CPC ........ G06F 9/3001; G06F 7/57; G06F 9/3889; G06F 9/3893; G06F 9/3895; G06F 15/8023; G06F 9/3885
See application file for complete search history.

(56) References Cited

U.S. PATENT DOCUMENTS

| | | | |
|---|---|---|---|
| 10,474,458 B2 * | 11/2019 | Kaul | G06N 3/063 |
| 2002/0059257 A1 * | 5/2002 | Matsumura | G06Q 10/087 |
| 2016/0342568 A1 * | 11/2016 | Burchard | G06F 9/5072 |
| 2017/0017608 A1 * | 1/2017 | Pais | G06F 15/173 |
| 2020/0301823 A1 * | 9/2020 | Kabasawa | G06F 8/10 |

* cited by examiner

*Primary Examiner* — Farley Abad
(74) *Attorney, Agent, or Firm* — Conley Rose, P.C.

(57) ABSTRACT

A data processing apparatus includes a searching module, a first functional module (FM), and a second FM. The first FM implements a service sub-function of a first category. The second FM implements a service sub-function of a second category. The searching module determines first entry data based on first data in target data, and determines second entry data based on second data in the target data. The first data is related to a first service sub-function. The second data is related to a second service sub-function. The first service sub-function belongs to the first category. The second service sub-function belongs to the second category. The first FM performs a first functional operation based on the first data and the first entry data. The second FM performs a second functional operation based on the second data and the second entry data.

30 Claims, 7 Drawing Sheets

DATA PROCESSING METHOD AND APPARATUS, PROCESSOR, AND NETWORK DEVICE

CROSS-REFERENCE TO RELATED APPLICATIONS

This application claims priority to Chinese Patent Application No. 202211238017.1 filed on Oct. 10, 2022 and Chinese Patent Application No. 202211649905.2 filed on Dec. 21, 2022, both of which are incorporated herein by reference in their entireties.

TECHNICAL FIELD

The present disclosure relates to the field of network technologies, and in particular, to a data processing method and apparatus, a processor, and a network device.

BACKGROUND

A processor in a network device includes a match action (MA) apparatus, where the MA apparatus includes a match unit (MU) and an action unit (AU). The match unit may perform a matching operation based on target data received by the MA apparatus, and the action unit may perform service processing based on a matching result of the match unit and the target data. For example, the action unit includes an arithmetic logic unit (ALU) array, and the ALU array includes a plurality of ALUs. The match unit determines entry data corresponding to the target data and a target ALU in the ALU array. The target ALU performs a processing operation based on the target data and the entry data.

However, the ALU can perform only simple processing operations (for example, OR operations, AND operations, and non-operations). A complete service function generally includes a plurality of service sub-functions, and implementation of each service sub-function generally requires a plurality of ALUs to participate in operations. Therefore, the ALU array needs to include a large quantity of ALUs, resulting in high resource consumption and costs of the processor.

SUMMARY

The present disclosure provides a data processing method and apparatus, a processor, and a network device, to help reduce resource consumption and costs of a processor, reduce a chip area of the processor, and improve performance of the processor. Technical solutions of the present disclosure are as follows:

According to a first aspect, a processor comprising a data processing apparatus, where the data processing apparatus includes a searching module, a first functional module, and a second functional module. The first functional module is configured to implement a service sub-function of a first category, the second functional module is configured to implement a service sub-function of a second category, and the first category is different from the second category. The searching module is configured to: determine first entry data based on first data in target data received by the data processing apparatus, and determine second entry data based on second data in the target data, where the first data is data related to a first service sub-function, the second data is data related to a second service sub-function, the first service sub-function and the second service sub-function are two service sub-functions in a first service function, the first service sub-function belongs to the first category, and the second service sub-function belongs to the second category. The first functional module is configured to perform a first functional operation based on the first data and the first entry data to implement the first service sub-function. The second functional module is configured to perform a second functional operation based on the second data and the second entry data to implement the second service sub-function.

According to the technical solution provided in the present disclosure, one functional module can implement a service sub-function of one category. Compared with a solution in which a plurality of ALUs is used to implement one specific service sub-function, structures of the data processing apparatus and the processor can be simplified, resource consumption and costs of the processor can be reduced, a chip area of the processor can be reduced, and performance of the processor can be improved.

Optionally, the first functional module performs the first functional operation based on the first data and the first entry data to obtain a first operation result, the second functional module performs the second functional operation based on the second data and the second entry data to obtain a second operation result, and the data processing apparatus further includes a first output module configured to output the first operation result and the second operation result.

According to the technical solution provided in the present disclosure, the first functional module and the second functional module are two parallel functional modules, and a combination of the first operation result and the second operation result can be implemented (in other words, a function combination of the first functional module and the second functional module can be implemented) by setting the first output module to output the first operation result and the second operation result.

Optionally, the first output module is configured to output the first operation result and the second operation result based on first control information, the first control information is determined based on type data in the target data, and the type data represents a service type of the first service function.

According to the technical solution provided in the present disclosure, because the first output module outputs the first operation result and the second operation result based on the first control information, output of the first operation result and the second operation result by the first output module is controllable.

Optionally, the data processing apparatus includes a plurality of functional modules, the plurality of functional modules is in a one-to-one correspondence with a plurality of categories, each functional module in the plurality of functional modules is configured to implement a service sub-function of a corresponding category, and the plurality of functional modules include the first functional module and the second functional module. The first output module is configured to: determine the first functional module and the second functional module based on the first control information; output the first operation result based on the first functional module; and output the second operation result based on the second functional module. For example, the first control information includes indication information of the first functional module and indication information of the second functional module. The first output module determines the first functional module based on the indication information of the first functional module, and then outputs the first operation result. The first output module determines the second functional module based on the indication information of the second functional module, and then outputs the second operation result.

According to the technical solution provided in the present disclosure, the plurality of functional modules is in a parallel relationship, and the plurality of functional modules include the first functional module and the second functional module. The combination of the first operation result and the second operation result can be implemented (in other words, the function combination of the first functional module and the second functional module can be implemented) by setting the first output module to output the first operation result and the second operation result based on the first control information. In the present disclosure, basic functions (namely, specific service sub-functions) included in a service function faced by a network are abstracted into service sub-functions of a plurality of categories (where a service sub-function of each category is an abstraction of a specific service sub-function of the category). A plurality of functional modules in a one-to-one correspondence with the plurality of categories are defined. The plurality of functional modules is used to implement the service sub-functions of the plurality of categories in a one-to-one manner. The plurality of functional modules is parallelized, and then combined through the first output module, to implement free combination of operation results of the plurality of functional modules (or in other words, free combination of functions of the plurality of functional modules).

Optionally, the data processing apparatus further includes a first control module configured to determine the first control information based on the type data.

According to the technical solution provided in the present disclosure, the first control module determines the first control information based on the type data in the target data. The first output module determines the first functional module and the second functional module based on the first control information, and further outputs the first operation result corresponding to the first functional module and the second operation result corresponding to the second functional module. In this way, the combination of the first operation result and the second operation result can be implemented (in other words, the function combination of the first functional module and the second functional module can be implemented). In addition, the first control module is configurable. The first control module may obtain the type data in the target data based on user configuration information, and further determine the first control information based on the type data. In this way, the data processing apparatus is functionally capable of freely combining functional modules. A user can freely configure combinations of functional modules based on service requirements.

Optionally, the first control module is configured to: determine a first rule based on the type data and a first rule table, where the first rule indicates that the first service function includes the service sub-function of the first category and the service sub-function of the second category; determine the first functional module and the second functional module according to the first rule; and generate the first control information based on the first functional module and the second functional module. For example, the first rule indicates categories of service sub-functions included in the first service function, to indicate that the first service function includes the service sub-function of the first category and the service sub-function of the second category.

According to the technical solution provided in the present disclosure, the first control module determines the categories of the service sub-functions included in the first service function based on the type data in the target data and the first rule table, and then generates the first control information based on the categories of the service sub-functions included in the first service function. The first output module determines the first functional module and the second functional module based on the first control information, and further outputs the first operation result corresponding to the first functional module and the second operation result corresponding to the second functional module. In this way, the combination of the first operation result and the second operation result can be implemented (in other words, the function combination of the first functional module and the second functional module can be implemented). The data processing apparatus is functionally capable of freely combining functional modules.

Optionally, the data processing apparatus further includes a function supplement module configured to perform a third functional operation based on second control information and third data in the target data to implement a third service sub-function, where the third service sub-function is a service sub-function in the first service function, the third data is data related to the third service sub-function, and the second control information is determined based on the third data. The third service sub-function is different from the first service sub-function and the second service sub-function, or the third service sub-function is the same as one of the first service sub-function and the second service sub-function.

According to the technical solution provided in the present disclosure, the plurality of functional modules is collectively referred to as a function-level processing part. In the present disclosure, the function supplement module is disposed to supplement functions of the function-level processing part. For a service sub-function that cannot be implemented by the function-level processing part, or when some functional modules of the function-level processing part are not perfect, leading to low accuracy of implementing corresponding service sub-functions, the function supplement module can be used to implement such service sub-functions. This improves a processing capability of the data processing apparatus. In addition, the data processing apparatus has a fault tolerance capability and a function expansion capability.

Optionally, the second control information includes a first instruction address, and the function supplement module is configured to: obtain a first instruction based on the first instruction address, and perform a processing operation on the third data by executing the first instruction, where the third functional operation includes the processing operation.

Optionally, the function supplement module includes an ALU array, and the ALU array includes a plurality of ALUs. The plurality of ALUs include a target ALU. The target ALU is configured to: obtain the first instruction based on the first instruction address, and perform the processing operation on the third data by executing the first instruction.

According to the technical solution provided in the present disclosure, the function supplement module including the ALU array is used to supplement functions of the function-level processing part. The function supplement module and the function-level processing part may jointly implement service functions. Because the function-level processing part can implement most or even all service sub-functions, the function supplement module only needs to implement a small part of the service sub-functions. In this way, the ALU array in the function supplement module may be set smaller, for example, a quantity of rows and a quantity of columns of the ALU array may be set smaller, as long as the ALU array includes fewer ALUs. In this way, structures of the data processing apparatus and the processor can be simplified, resource consumption and costs of the processor can be reduced, and performance of the processor can be improved.

Optionally, the data processing apparatus further includes an instruction storage module, the first instruction is stored in the instruction storage module, and the function supplement module is configured to obtain the first instruction in the instruction storage module based on the first instruction address. For example, the instruction storage module stores an instruction set, and the instruction set includes the first instruction.

Optionally, the data processing apparatus further includes a second control module configured to determine the second control information based on the third data.

According to the technical solution provided in the present disclosure, the second control module determines the second control information based on the third data, so that the function supplement module can perform the third functional operation based on the second control information and the third data in the target data.

Optionally, the searching module is further configured to determine third entry data based on the third data; and the second control module is configured to determine the second control information based on the third data and the third entry data.

Optionally, the second control module is configured to: determine a second rule based on the third data and a second rule table, where the second rule includes the first instruction address; and generate the second control information according to the second rule. The second rule may further include indication information of the target ALU. The second control module determines the target ALU based on the indication information of the target ALU, and then sends the second control information to the target ALU.

Optionally, the function supplement module performs the third functional operation based on the second control information and the third data to obtain a third operation result, and the data processing apparatus further includes a second output module configured to output the third operation result. The second output module and the first output module may be a same output module or different output modules.

According to the technical solution provided in the present disclosure, the second output module outputs the third operation result, to implement a combination of the first operation result, the second operation result, and the third operation result (or in other words, implement a function combination of the first functional module, the second functional module, and the function supplement module). In other words, a combination of the operation result of the function supplement module and the operation result of the functional module is implemented.

Optionally, the first functional module includes a dedicated circuit, and the dedicated circuit is configured to implement the service sub-function of the first category. The dedicated circuit may be a dedicated logic circuit, and the dedicated circuit may be a programmable circuit, and may be an integrated circuit.

Compared with the ALU array, in the technical solution provided in the present disclosure, processing resources of the dedicated circuit are more simplified. Therefore, resource consumption can be effectively reduced by using the dedicated circuit to implement the service sub-function of the first category.

Optionally, the second functional module includes a calculation submodule and an execution submodule, the calculation submodule is configurable, and the calculation submodule and the execution submodule are configured to implement the service sub-function of the second category. The calculation submodule may also be referred to as a branch submodule.

According to the technical solution provided in the present disclosure, the second functional module includes the calculation submodule and the execution submodule, and the calculation submodule is configurable. Therefore, the second functional module can implement the service sub-function of the second category based on a configuration. The second functional module has high flexibility in implementing the service sub-function of the second category.

Optionally, at least one of the second data and the second entry data includes control data. The calculation submodule is configured to determine execution information based on the control data in the second data and the second entry data, where the execution information indicates to perform the second functional operation. The execution submodule is configured to perform the second functional operation based on the execution information. For example, the execution submodule performs the second functional operation based on the execution information and non-control data in the second data and the second entry data.

Optionally, the first control module includes a ternary content-addressable memory (TCAM).

Optionally, the second control module includes a TCAM.

Optionally, the data processing apparatus further includes a selection module configured to: determine a third rule based on a third rule table and fourth data in the target data, where the third rule includes indication information of the first data. The searching module is further configured to obtain the first data based on the indication information of the first data. The selection module may also be referred to as a program selection (programSel) module.

Optionally, the target data is data related to a same packet. For example, the target data is data related to a first packet, and the target data includes packet header information of the first packet, related information of an ingress port of the first packet, and the like.

Optionally, the data processing apparatus is an MA apparatus, the MA apparatus includes an MU and an AU, and the match unit includes the searching module. The action unit includes the first functional module and the second functional module. The match unit may further include the selection module, the first control module, and the second control module. The action unit may further include the function supplement module and the instruction storage module.

According to a second aspect, a data processing method is provided, applied to a data processing apparatus in a processor, where the data processing apparatus includes a searching module, a first functional module, and a second functional module. The first functional module is configured to implement a service sub-function of a first category, the second functional module is configured to implement a service sub-function of a second category, and the first category is different from the second category. The method includes: The searching module determines first entry data based on first data in target data received by the data processing apparatus, and determines second entry data based on second data in the target data, where the first data is data related to a first service sub-function, the second data is data related to a second service sub-function, the first service sub-function and the second service sub-function are two service sub-functions in a first service function, the first service sub-function belongs to the first category, and the second service sub-function belongs to the second category;

the first functional module performs a first functional operation based on the first data and the first entry data to implement the first service sub-function; and the second functional module performs a second functional operation based on the second data and the second entry data to implement the second service sub-function.

Optionally, the first functional module performs the first functional operation based on the first data and the first entry data to obtain a first operation result, the second functional module performs the second functional operation based on the second data and the second entry data to obtain a second operation result, the data processing apparatus further includes a first output module, and the method further includes: The first output module outputs the first operation result and the second operation result.

Optionally, that the first output module outputs the first operation result and the second operation result includes: The first output module outputs the first operation result and the second operation result based on first control information, where the first control information is determined based on type data in the target data, and the type data represents a service type of the first service function.

Optionally, the data processing apparatus includes a plurality of functional modules, the plurality of functional modules is in one-to-one correspondence with a plurality of categories, each functional module in the plurality of functional modules is configured to implement a service sub-function of a corresponding category, and the plurality of functional modules include the first functional module and the second functional module. That the first output module outputs the first operation result and the second operation result based on first control information includes: The first output module determines the first functional module and the second functional module based on the first control information; the first output module outputs the first operation result based on the first functional module; and the first output module outputs the second operation result based on the second functional module.

Optionally, the data processing apparatus further includes a first control module, and the method further includes: The first control module determines the first control information based on the type data.

Optionally, that the first control module determines the first control information based on the type data includes: The first control module determines a first rule based on the type data and a first rule table, where the first rule indicates that the first service function includes the service sub-function of the first category and the service sub-function of the second category; the first control module determines the first functional module and the second functional module according to the first rule; and the first control module generates the first control information based on the first functional module and the second functional module.

Optionally, the data processing apparatus further includes a function supplement module, and the method further includes: The function supplement module performs a third functional operation based on second control information and third data in the target data to implement a third service sub-function, where the third service sub-function is a service sub-function in the first service function, the third data is data related to the third service sub-function, and the second control information is determined based on the third data.

Optionally, the second control information includes a first instruction address, and that the function supplement module performs a third functional operation based on second control information and third data includes: The function supplement module obtains a first instruction based on the first instruction address; and the function supplement module performs a processing operation on the third data by executing the first instruction, where the third functional operation includes the processing operation.

Optionally, the function supplement module includes an ALU array, the ALU array includes a plurality of ALUs, and the plurality of ALUs include a target ALU. That the function supplement module obtains a first instruction based on the first instruction address includes: The target ALU obtains the first instruction based on the first instruction address. That the function supplement module performs a processing operation on the third data by executing the first instruction includes: The target ALU performs the processing operation on the third data by executing the first instruction.

Optionally, the data processing apparatus further includes an instruction storage module, the first instruction is stored in the instruction storage module, and the obtaining, by the function supplement module, a first instruction based on the first instruction address includes: The function supplement module obtains the first instruction in the instruction storage module based on the first instruction address.

Optionally, the data processing apparatus further includes a second control module, and the method further includes: The second control module determines the second control information based on the third data.

Optionally, the method further includes: The searching module determines third entry data based on the third data.

That the second control module determines the second control information based on the third data includes: The second control module determines the second control information based on the third data and the third entry data.

Optionally, that the second control module determines the second control information based on the third data includes: The second control module determines a second rule based on the third data and a second rule table, where the second rule includes the first instruction address; and the second control module generates the second control information according to the second rule.

Optionally, the function supplement module performs the third functional operation based on the second control information and the third data to obtain a third operation result, the data processing apparatus further includes a second output module, and the method further includes: The second output module outputs the third operation result.

Optionally, the first functional module includes a dedicated circuit, and the dedicated circuit is configured to implement the service sub-function of the first category.

Optionally, the second functional module includes a calculation submodule and an execution submodule, the calculation submodule is configurable, and the calculation submodule and the execution submodule are configured to implement the service sub-function of the second category.

Optionally, at least one of the second data and the second entry data includes control data, and that the second functional module performs a second functional operation based on the second data and the second entry data includes: The calculation submodule determines execution information based on the control data in the second data and the second entry data, where the execution information indicates to perform the second functional operation; and the execution submodule performs the second functional operation based on the execution information.

Optionally, the first control module includes a TCAM.

Optionally, the second control module includes a TCAM.

Optionally, the data processing apparatus further includes a selection module, and the method further includes: The selection module determines a third rule based on a third rule table and fourth data in the target data, where the third rule includes indication information of the first data; and the searching module obtains the first data based on the indication information of the first data.

Optionally, the target data is data related to a same packet.

Optionally, the data processing apparatus is a match action MA apparatus, the MA apparatus includes a match unit and an action unit, the match unit includes the searching module, and the action unit includes the first functional module and the second functional module.

According to a third aspect, a processor is provided, including the data processing apparatus according to the first aspect or any one of the optional implementations of the first aspect. The processor may be a programmable processor. The processor includes a programmable logic circuit and/or program instructions. During running, the processor is configured to implement the method according to the second aspect or any one of the optional implementations of the second aspect.

Optionally, the processor is an application-specific integrated circuit (ASIC) chip, a field-programmable gate array (FPGA) chip, a network processor (NP) chip, or a generic array logic (GAL) chip.

According to a fourth aspect, a network device is provided, including the processor according to the third aspect.

For technical effects of the second aspect to the fourth aspect, refer to the technical effects of the first aspect. Details are not described herein again.

DESCRIPTION OF EMBODIMENTS

Figure 1:
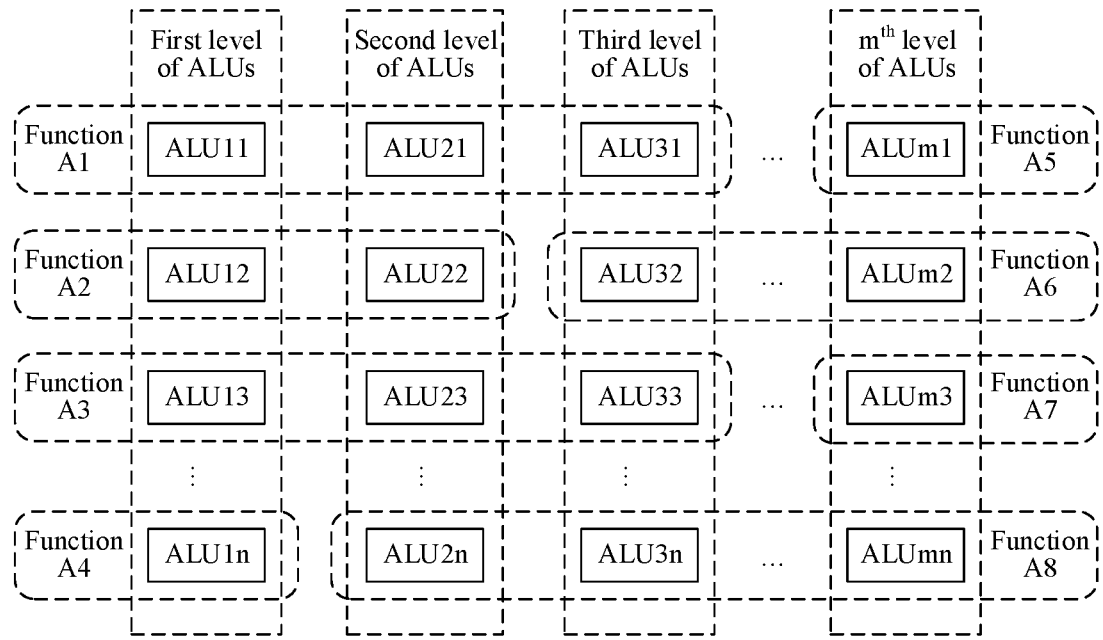
FIG. 1 is a distribution diagram of function points of a service function according to an embodiment of the present disclosure.

The following further describes in detail implementations of the present disclosure with reference to the accompanying drawings.

A processor in a network device includes an MA apparatus and a data bus. The MA apparatus includes an MU and an AU, where the match unit and the action unit are separately connected to the data bus, and both the match unit and the action unit may obtain target data from the data bus. The match unit may perform a matching operation based on the target data, and the action unit may perform service processing based on a matching result of the match unit and the target data. For example, the action unit includes an ALU array and an instruction memory (IMEM), the ALU array includes a plurality of ALUs, and the plurality of ALUs are separately connected to the match unit. The plurality of ALUs is separately connected to the IMEM, and the plurality of ALUs are separately connected to the data bus. The IMEM is configured to store an instruction set. The match unit stores a data table. The match unit may search the data table based on the target data to determine entry data corresponding to the target data, determine a target instruction pointer (namely, an address of the target instruction) and a target ALU in the ALU array based on the target data and the entry data, and send the entry data and the target instruction pointer to the target ALU. The target ALU obtains a target instruction from the IMEM based on the target instruction pointer, performs a processing operation based on the target data and the entry data by executing the target instruction, and outputs a processing result.

The instruction set stored in the IMEM includes a series of instructions irrelevant to a protocol. The instruction set is also referred to as a basic instruction set or a processing instruction set, and an instruction in the instruction set is also referred to as a basic instruction or a processing instruction. Minimum processing logic of the ALU is an instruction, and using the minimum processing logic of the ALU as an instruction is a general implementation of the current processor (for example, a programmable processor). Each ALU in the ALU array may obtain any instruction in the IMEM, and process any data obtained by the ALU by executing the instruction, so that each ALU can implement arbitrary processing of any data. Therefore, the MA apparatus has higher processing flexibility and better scalability, and is widely used by the programmable processor. However, a processing level of the ALU is a single instruction level, and the ALU can execute only one instruction at a time, so that the ALU can perform only one simple processing operation (for example, an OR operation, an AND operation, and a non-operation) at a time. A complete service function generally includes a plurality of service sub-functions (or referred to as function points, basic functions, and the like). The implementation of each service sub-function generally requires a plurality of ALUs to participate in operations, and the implementation of one service function requires more ALUs to participate in operations. Therefore, the ALU array needs to include more ALUs, resulting in expansion of the ALU array. The structure of the MA apparatus and the structure of the processor including the MA apparatus are complex, and resource consumption of the MA apparatus and resource consumption of the processor including the MA apparatus are high (consumption of a circuit of the MA apparatus, and consumption of connection lines between the ALU array and the match unit, the data bus, and the like in the MA apparatus are high). The processor has high costs and low implementability, especially in a complex service and high-performance scenario, the processor has low implementability. In addition, to ensure that the processor can meet requirements of different service scenarios and ensure high performance of the processor, the ALU array is generally designed based on the most complex service scenario (or referred to as the strictest service scenario). To be specific, the ALU array is designed to include a large quantity of ALUs. However, the ALU array may not be fully utilized in most service scenarios, and the utilization rate of the ALU array is low.

In an example, FIG. 1 is a distribution diagram of function points of a service function A according to an embodiment of the present disclosure. An ALU array includes m levels of ALUs, each level of ALU includes n ALUs, and the service function A includes function points A1 to A8 (namely, service sub-functions A1 to A8). To implement the function point A1, ALU11, ALU21, and ALU31 need to perform operations in sequence (where an operation result of ALU11 is input data of ALU21, and an operation result of ALU21 is input data of ALU31). To implement the function point A2, ALU12 and ALU22 need to perform operations in sequence. To implement the function point A3, ALU13, ALU23, and ALU33 need to perform operations in sequence. The rule applies. It can be learned from FIG. 1 that the service function A has many function points, and the service function A is complex. If an MA apparatus needs to implement the service function A, an ALU array of the MA apparatus needs to include at least m levels of ALUs, and each level of ALU needs to include at least n ALUs. As a result, the ALU array includes a large quantity of ALUs.

Figure 2:
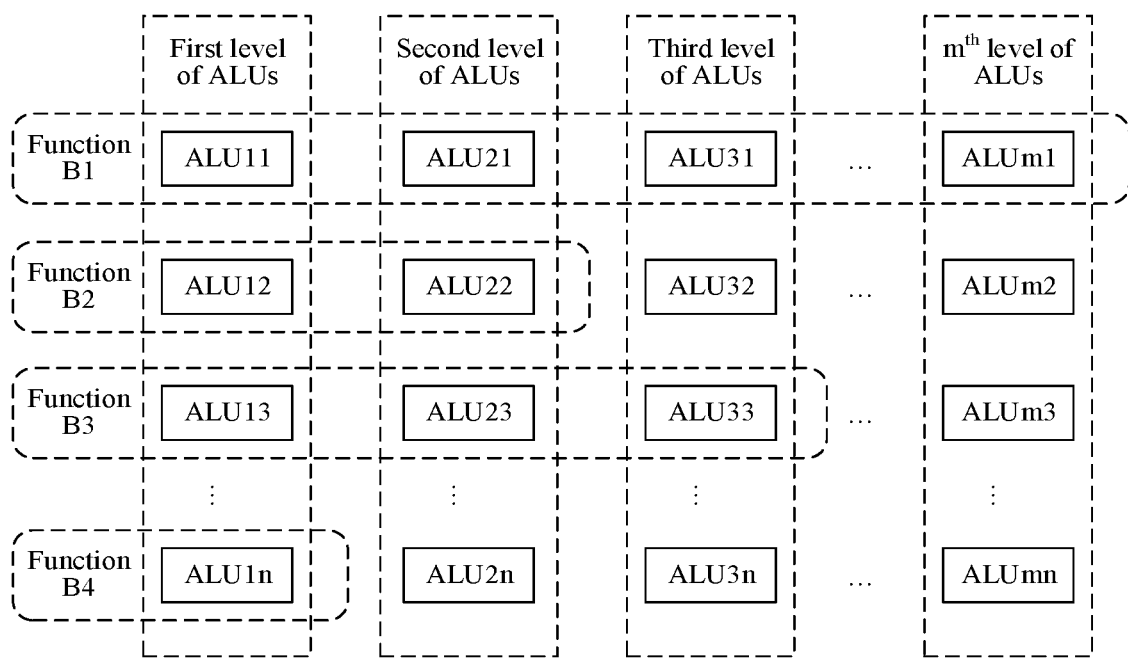
FIG. 2 is a distribution diagram of function points of another service function according to an embodiment of the present disclosure.

In another example, FIG. 2 is a distribution diagram of function points of a service function B according to an embodiment of the present disclosure. An ALU array includes m levels of ALUs, each level of ALU includes n ALUs, and the service function B includes function points B1 to B4 (namely, service sub-functions B1 to B4). To implement the function point B1, ALU11, ALU21, ALU31, . . . , and ALUm1 need to perform operations in sequence. To implement the function point B2, ALU12 and ALU22 need to perform operations in sequence. To implement the function point B3, ALU13, ALU23, and ALU33 need to perform operations in sequence. The rule applies. It can be learned from FIG. 2 that although the service function B has few function points, the implementation of the function point B1 consumes a large quantity of ALUs, and the function point B1 is complex. If an MA apparatus needs to implement the service function B, an ALU array of the MA apparatus needs to include at least m levels of ALUs, and each level of ALU needs to include at least n ALUs. As a result, the ALU array includes a large quantity of ALUs. In addition, to implement the service function B, ALU32 to ALUm2, ALU43 to ALUm3, . . . , and ALU2n to ALUmn do not need to participate in operations. When the service function B is implemented, ALU32 to ALUm2, ALU43 to ALUm3, . . . , and ALU2n to ALUmn are not used. Few ALUs are used in the ALU array. The utilization rate of the ALU array is low. If the ALU array is designed based on the service function B, in most service scenarios, few ALUs are used in the ALU array, and the utilization rate of the ALU array is low.

One service function generally includes a plurality of service sub-functions that are combined in parallel (where one service function includes a plurality of service sub-functions, the plurality of service sub-functions is in a parallel relationship, and operation results corresponding to the plurality of service sub-functions are in a combination relationship). Complexity of a service function mainly depends on a quantity of service sub-functions included in the service function and a combination manner of the service sub-functions. Based on this, in the present disclosure, basic functions (namely, specific service sub-functions) included in a service function faced by a network are abstracted into service sub-functions of a plurality of categories (where a service sub-function of each category is an abstraction of a specific service sub-function of the category). A plurality of functional modules in a one-to-one correspondence with the plurality of categories are defined. The plurality of functional modules is used to implement the service sub-functions of the plurality of categories in a one-to-one manner. In addition, in the present disclosure, the plurality of functional modules is parallelized and then combined, so that operation results of the plurality of functional modules can be combined. Therefore, in the present disclosure, the ALU array is converted into a combination of functional modules to implement the service function faced by the network. Compared with a solution in which a plurality of ALUs is used to implement one service sub-function, one functional module in the present disclosure can implement a service sub-function of one category, a structure of an MA apparatus and a processor including the MA apparatus can be simplified, resource consumption, a chip area, and costs of the MA apparatus and the processor including the MA apparatus can be reduced, and performance of the processor can be improved.

In this embodiment of the present disclosure, categories of service sub-functions may include an assignment category (corresponding to a service sub-function of the assignment category), an isolation category (corresponding to a service sub-function of the isolation category), and the like. The service sub-function of the assignment category is implemented by searching an assignment table. For example, the assignment table is searched based on packet information of a data packet. If the packet information matches the assignment table, a value (for example, a classification attribute) hit by the packet information is added to the data packet. For example, a user attribute is added to the data packet. The service sub-function of the isolation category is implemented by searching an isolation table. For example, the isolation table is searched based on a combination of a source operand and a destination operand (for example, a key value is constructed based on the source operand and the destination operand, and the isolation table is searched based on the key value). If the combination of the source operand and the destination operand hits the isolation table, a service corresponding to the combination of the source operand and the destination operand is discarded. The service sub-function of the isolation category may include: a port isolation function in a virtual local area network (VLAN), an isolation function of an ingress port and an egress port, a multi-protocol label switching (MPLS) split horizon function, and the like. In an example, it is assumed that a VLAN1 includes a port 11, a port 12, and a port 13 of a network device 1, and a port isolation rule in a VLAN isolation table is: Packets received from the port 11 cannot be sent from the port 13; and assuming that the network device 1 receives a packet 1 from the port 11, and an MA apparatus in the network device 1 determines, by searching a routing table, that an egress port of the packet 1 is the port 13, the MA apparatus searches the VLAN isolation table by using a combination of the port 11 and the port 13. If it is determined that the combination of the port 11 and the port 13 hits the VLAN isolation table, the MA apparatus discards the packet 1. In another example, it is assumed that the network device 1 includes the port 11, the port 12, and the port 13, and a port isolation rule in a port isolation table of the network device 1 is: Packets received from the port 11 cannot be sent from the port 13; and assuming that the network device 1 receives the packet 1 (where the ingress port of the packet 1 is the port 11) from the port 11, and an MA apparatus in the network device 1 determines, by searching a routing table, that an egress port of the packet 1 is the port 13, the MA apparatus searches the port isolation table by using a combination of the port 11 and the port 13. If it is determined that the combination of the port 11 and the port 13 hits the port isolation table, the MA apparatus discards the packet 1. In still another example, it is assumed that the network device 1 includes the port 11, the port 12, and the port 13, and an isolation rule in an MPLS split horizon table of the network device 1 is: A route learned from the port 11 is not sent from the port 11; and assuming that the network device 1 learns a route 1 from the port 11, the network device 1 sends the route 1 to a neighbor of the network device 1 through the port 12 and the port 13, but does not send the route 1 to the neighbor of the network device 1 through the port 11.

Figure 3:
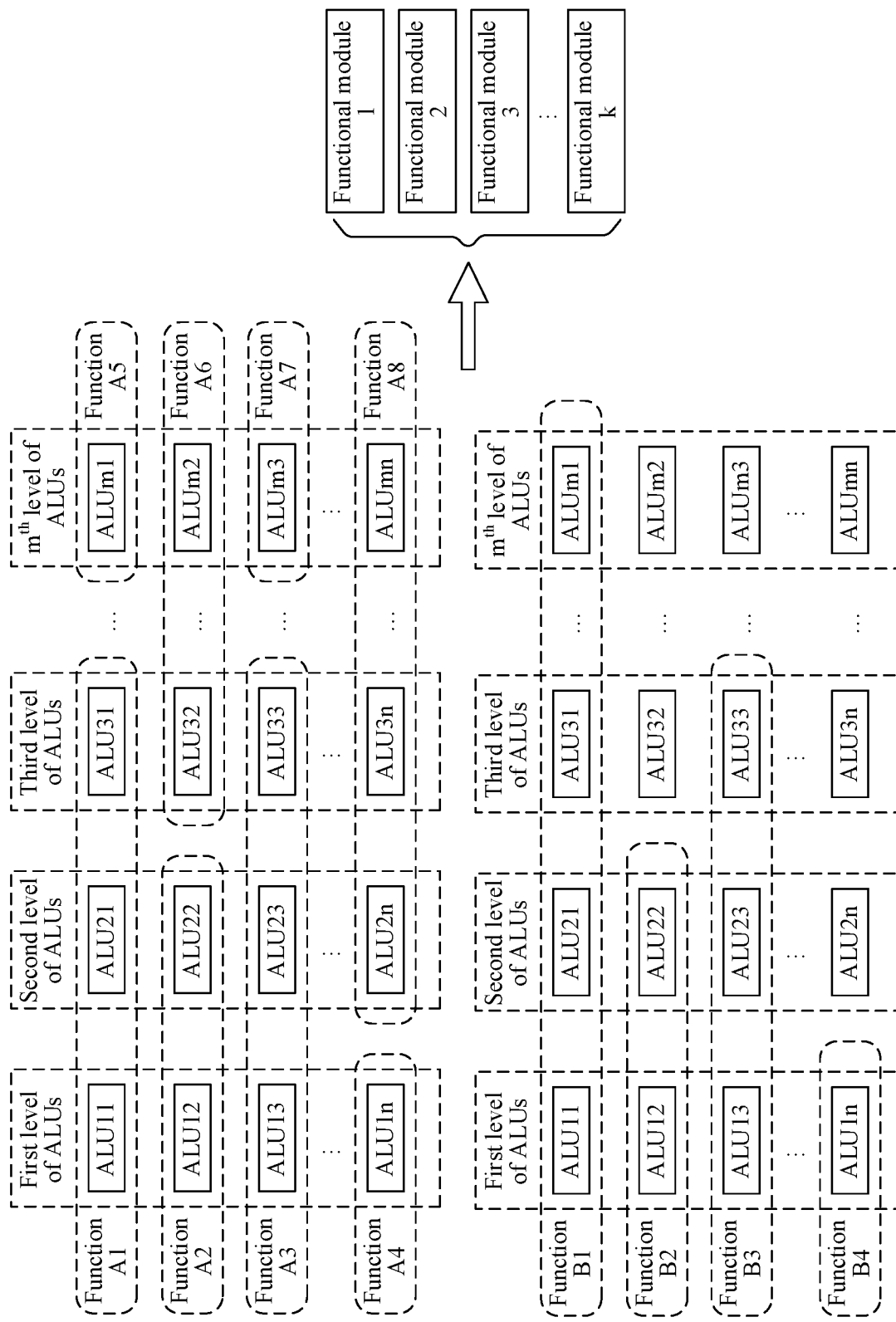
FIG. 3 is a schematic diagram of an abstraction process from an ALU array to a functional module according to an embodiment of the present disclosure.

For example, FIG. 3 is a schematic diagram of an abstraction process from an ALU array to a functional module according to an embodiment of the present disclosure. In FIG. 3, an example in which a service function faced by a network includes a service function A and a service function B is used for description. Basic functions (specific service sub-functions, namely, functions shown in FIG. 3) included in the service function A and the service function B may be abstracted into service sub-functions of k categories, k functional modules in a one-to-one correspondence with the k categories are defined, and the k functional modules are used to implement the service sub-functions of the k categories in a one-to-one manner. As shown in FIG. 3, it is assumed that the service sub-function A1 is a service sub-function of a category 1, the service sub-function B1 is a service sub-function of a category 2, the service sub-functions A2 and B2 are service sub-functions of a category 3, the service sub-functions A3 and B3 are service sub-functions of a category 4, the service sub-functions A4, A5, and B4 are service sub-functions of a category 5, the service sub-function A6 is a service sub-function of a category 6, the service sub-function A7 is a service sub-function of a category 7, and the service sub-function A8 is a service sub-function of a category 8. In this case, the basic functions included in the service function A and the service function B are abstracted into the service sub-functions of eight categories, and eight functional modules in a one-to-one correspondence with the eight categories are defined. It is assumed that the eight categories are categories 1 to 8, the eight functional modules are functional modules 1 to 8, and categories 1 to 8 are in a one-to-one correspondence with the functional modules 1 to 8. In this case, the functional module 1 is configured to implement a service sub-function of the category 1, the functional module 2 is configured to implement a service sub-function of the category 2, the functional module 3 is configured to implement a service sub-function of the category 3, and so on. All or some of the k functional modules shown in FIG. 3 may be implemented by using a dedicated circuit (for example, a dedicated logic circuit), or may be implemented by using a programmable circuit. Compared with the solution in which a plurality of ALUs is used to implement one service sub-function, the functional modules shown in FIG. 3 have lower resource consumption and costs.

The following describes an embodiment of a data processing apparatus in the present disclosure.

Figure 4:
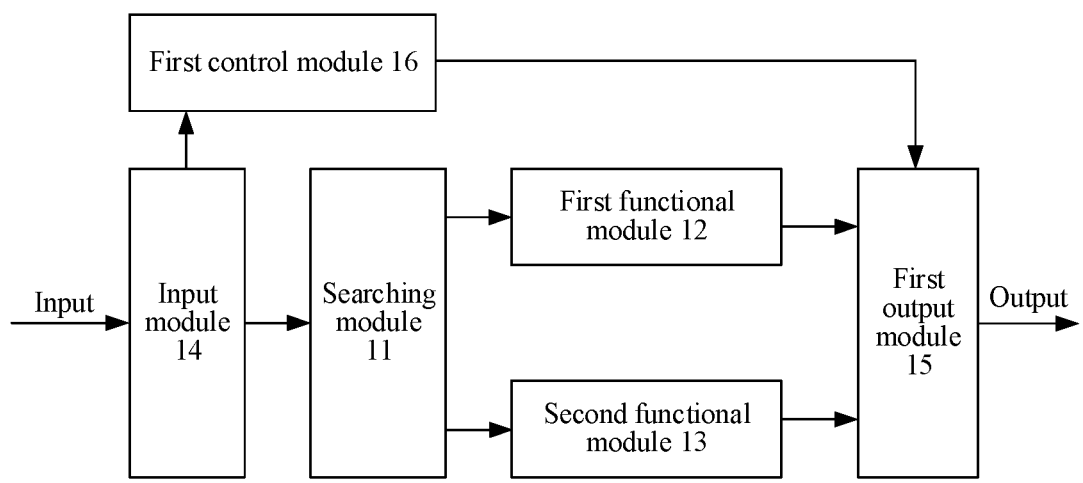
FIG. 4 is a schematic diagram of a data processing apparatus according to an embodiment of the present disclosure.

FIG. 4 is a schematic diagram of a data processing apparatus according to an embodiment of the present disclosure. The data processing apparatus is used in a processor, and the data processing apparatus includes a searching module 11, a first functional module 12, and a second functional module 13. The searching module 11 is separately connected to the first functional module 12 and the second functional module 13. The first functional module 12 is configured to implement a service sub-function of a first category, and the second functional module 13 is configured to implement a service sub-function of a second category. The first category is different from the second category.

The searching module 11 is configured to: determine first entry data based on first data in target data received by the data processing apparatus, and determine second entry data based on second data in the target data. The first functional module 12 is configured to perform a first functional operation based on the first data and the first entry data to implement the first service sub-function. The second functional module 13 is configured to perform a second functional operation based on the second data and the second entry data to implement the second service sub-function. The first data is data related to a first service sub-function, the second data is data related to a second service sub-function, the first service sub-function and the second service sub-function are two service sub-functions in a first service function, the first service sub-function belongs to the first category, and the second service sub-function belongs to the second category. For example, the first category is an assignment category, the second category is an isolation category, the first functional module 12 is configured to implement a service sub-function of the assignment category, and the second functional module 13 is configured to implement a service sub-function of the isolation category. The first service sub-function is a specific service sub-function of the assignment category, for example, adding a user attribute to a packet. The second service sub-function is a specific service sub-function of the isolation category, for example, a port isolation function in a VLAN.

After determining the first entry data, the searching module 11 may send the first entry data to the first functional module 12, so that the first functional module 12 can perform the first functional operation based on the first data and the first entry data. After determining the second entry data, the searching module 11 may send the second entry data to the second functional module 13, so that the second functional module 13 can perform the second functional operation based on the second data and the second entry data. Optionally, the searching module 11 further sends the first data to the first functional module 12, or the first functional module 12 actively obtains the first data from the target data. In addition, the searching module 11 further sends the second data to the second functional module 13, or the second functional module 13 actively obtains the second data from the target data. This is not limited in this embodiment of the present disclosure.

The target data is data received by the data processing apparatus, and the target data is data related to a same packet. For example, the target data is data related to a first packet, and the target data includes any possible information related to the first packet. For example, the target data includes packet header information of the first packet, related information of an ingress port of the first packet, and the like. The packet header information of the first packet includes but is not limited to a 5-tuple, a source media access control (MAC) address, a destination MAC address, tunnel information, priority information, service requirement information, a virtual private network (VPN) identifier, a VLAN identifier, and the like that are carried in a packet header of the first packet. The ingress port of the first packet is a port through which the network device of the data processing apparatus receives the first packet, and related information of the ingress port includes but is not limited to indication information (for example, a port number) of the ingress port, configuration information of the ingress port, association information of the ingress port, and the like. Optionally, the data processing apparatus includes an input module 14, and the target data is data received by the input module 14. The input module 14 may be separately connected to the searching module 11, the first functional module 12, and the second functional module 13 (FIG. 4 does not show connection lines between the input module 14 and the first functional module 12 and the second functional module 13 for brevity). The searching module 11 may obtain the target data from the input module 14, or the searching module 11 obtains the first data and the second data in the target data from the input module 14. The first functional module 12 may obtain the first data in the target data from the input module 14. The second functional module 13 may obtain the second data in the target data from the input module 14. In an example, the input module 14 includes a data bus, the data bus is configured to receive and transmit the target data, the data bus may include a plurality of data lines, and the searching module 11 may be connected to all the plurality of data lines. The first functional module 12 and the second functional module 13 are respectively connected to all or some data lines in the plurality of data lines. For example, the first functional module 12 is connected to a first group of data lines in the plurality of data lines to obtain the first data from the first group of data lines. The second functional module 13 is connected to a second group of data lines in the plurality of data lines to obtain the second data from the second group of data lines. The first group of data lines and the second group of data lines each include at least one data line. For example, a bit width of the data bus is a plurality of bytes, and each byte corresponds to at least one data line in the data bus. The first group of data lines is a data line corresponding to at least one of the plurality of bytes, for example, a data line corresponding to a first byte. The second group of data lines is a data line corresponding to at least one byte in the plurality of bytes, for example, a data line corresponding to a second byte. Optionally, the data processing apparatus is used in a processor, the processor includes a data bus, the data bus of the processor is partially located in the data processing apparatus, and the data bus included in the input module 14 is a part of the data bus of the processor that is located in the data processing apparatus. Alternatively, the data bus of the processor and the data bus included in the input module 14 are independent of each other, and the data bus included in the input module 14 is connected to the data bus of the processor. This is not limited in this embodiment of the present disclosure.

In this embodiment of the present disclosure, the searching module 11 may store a first data table and a second data table. The searching module 11 may search the first data table based on the first data, to determine entry data that is in the first data table and that matches the first data. The searching module 11 determines the entry data that is in the first data table and that matches the first data as the first entry data. The searching module 11 may search the second data table based on the second data, to determine entry data that is in the second data table and that matches the second data. The searching module 11 determines the entry data that is in the second data table and that matches the second data as the second entry data. The first data table and the second data table may be a same data table, or may be two different data tables. If the first data table and the second data table are a same data table, the first entry data and the second entry data may be located in different entries of the same data table, or may be located in a same entry of the same data table. For example, a same entry in the same data table includes entry data related to service sub-functions of a plurality of categories. The searching module 11 searches the data table based on a combination of the first data and the second data, to obtain entry data that matches the combination of the first data and the second data. The searching module 11 determines entry data related to the first service sub-function in the entry data as the first entry data, and the searching module 11 determines entry data related to the second service sub-function in the entry data as the second entry data.

In this embodiment of the present disclosure, the first data may include one or more pieces of data. The searching module 11 searches the first data table based on all or a part of data included in the first data, to determine the entry data that is in the first data table and that matches the first data. The first functional module 12 performs the first functional operation based on all or a part of data included in the first data and all or a part of data included in the first entry data. Similarly, the second data includes one or more pieces of data. The searching module 11 searches the second data table based on all or a part of data included in the second data, to determine the entry data that is in the second data table and that matches the second data. The second functional module 13 performs the second functional operation based on all or a part of data included in the second data and all or a part of data included in the second entry data. For example, the first service sub-function is the port isolation function in the VLAN, the first data includes the indication information (for example, the port number) of the ingress port of the first packet and the destination MAC address of the first packet, and the first data table is a MAC forwarding table. The searching module 11 searches the MAC forwarding table based on the destination MAC address of the first packet, to determine indication information (for example, a port number) of an egress port of the first packet, where the first entry data includes the indication information of the egress port of the first packet. That the first functional module 12 performs the first functional operation based on the first data and the first entry data includes: The first functional module 12 searches the VLAN isolation table based on the indication information that is of the ingress port of the first packet and that is included in the first data and the indication information that is of the egress port of the first packet and that is included in the first entry data. It is determined that the indication information of the ingress port of the first packet and the indication information of the egress port of the first packet hit the port isolation table, and the first functional module 12 discards the first packet and outputs an isolation flag. For example, the isolation flag is flag=1, indicating that port isolation is performed on the first packet. For example, the second service sub-function is the function of adding a user attribute to a packet, the second data includes the VLAN identifier of the first packet, and the second data table is a user attribute assignment table. The searching module 11 searches the user attribute assignment table based on the VLAN identifier of the first packet to determine a first user attribute corresponding to the VLAN identifier. The second entry data includes the first user attribute, and may further include the VLAN identifier. That the second functional module 13 performs the second functional operation based on the second data and the second entry data includes: The second functional module 13 determines that the VLAN identifier included in the second data matches the VLAN identifier included in the second entry data, and the second functional module 13 adds the first user attribute to the first packet.

The first functional module 12 performs the first functional operation based on the first data and the first entry data to obtain a first operation result, and the second functional module 13 performs the second functional operation based on the second data and the second entry data to obtain a second operation result. For example, the first service sub-function is the port isolation function in the VLAN, and the first operation result is flag=1. The second service sub-function is the function of adding a user attribute to a packet, and the first operation result is the first packet to which the first user attribute is added. Refer to FIG. 4. The data processing apparatus further includes a first output module 15. The first output module 15 is separately connected to the first functional module 12 and the second functional module 13, and the first output module 15 is configured to output the first operation result and the second operation result.

Optionally, the first output module 15 is configured to output the first operation result and the second operation result based on first control information, the first control information is determined based on type data in the target data, and the type data represents a service type of the first service function. Service functions of different service types include different service sub-functions. Still refer to FIG. 4. The data processing apparatus further includes a first control module 16. The first control module 16 is connected to the first output module 15. The first control module 16 is configured to determine the first control information based on the type data in the target data, and send the first control information to the first output module 15, so that the first output module 15 determines the first functional module 12 and the second functional module 13 based on the first control information. The first control module 16 is further connected to the input module 14. The first control module 16 obtains the target data or the type data in the target data from the input module 14, and further determines the first control information based on the type data. For example, the first control module 16 includes a TCAM, the first control module 16 is configurable, and the first control module 16 obtains the type data from the input module 14 based on local configuration information.

Figure 5:
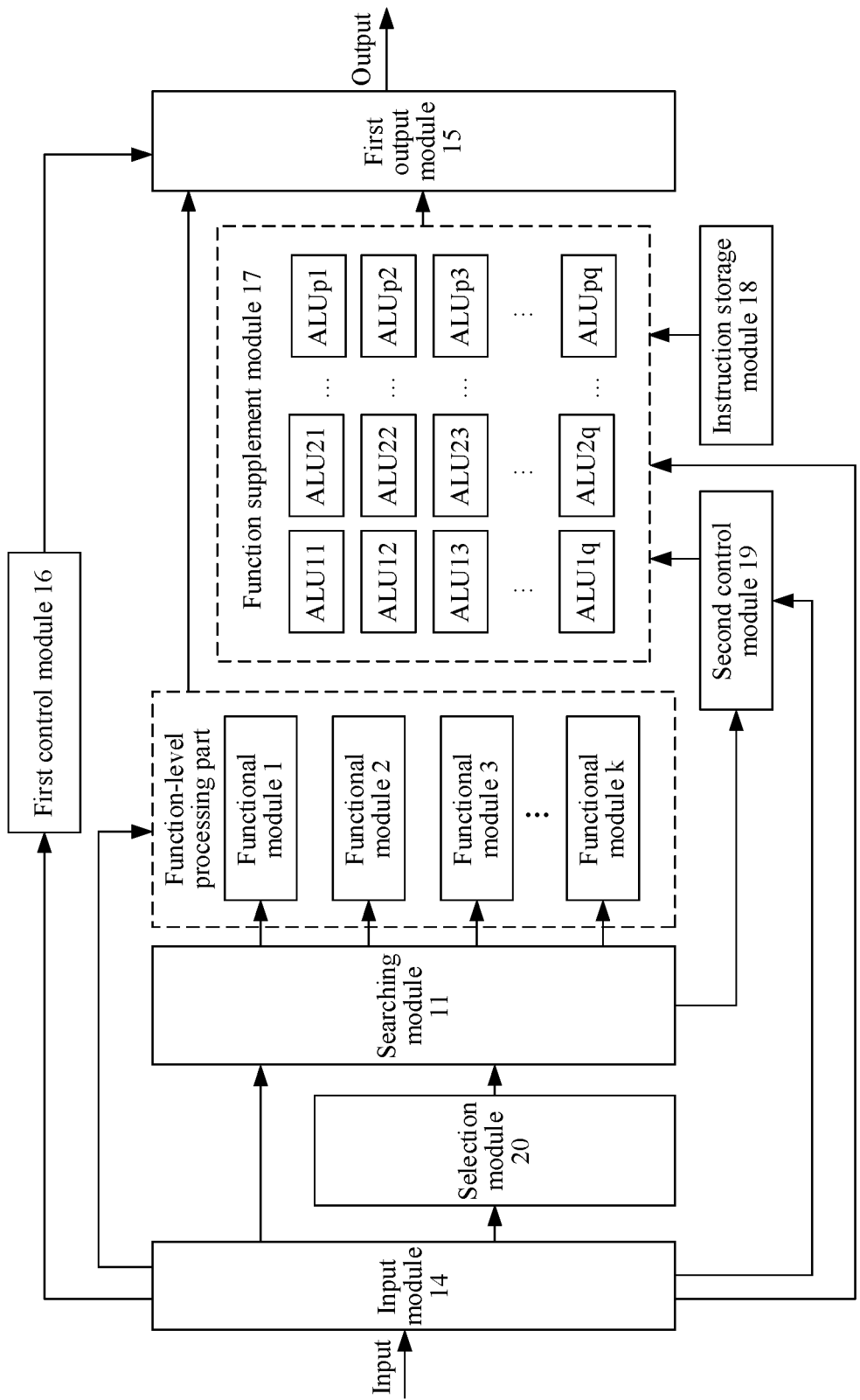
FIG. 5 is a schematic diagram of another data processing apparatus according to an embodiment of the present disclosure.

FIG. 5 is a schematic diagram of another data processing apparatus according to an embodiment of the present disclosure. The data processing apparatus includes a plurality of functional modules. In FIG. 5, an example in which the plurality of functional modules are k functional modules is used for description. The plurality of functional modules is in a one-to-one correspondence with a plurality of categories. Each functional module in the plurality of functional modules is configured to implement a service sub-function of a corresponding category. The plurality of functional modules includes a first functional module 12 and a second functional module 13 (where the first functional module 12 and the second functional module 13 are any two functional modules in the plurality of functional modules). The k functional modules are respectively connected to a searching module 11, an input module 14, and a first output module 15 (where the k functional modules are collectively referred to as a function-level processing part in FIG. 5 for brevity, a connection line between the function-level processing part and the input module 14 indicates that the k functional modules are connected to the input module 14, and a connection line between the function-level processing part and the first output module 15 indicates that the k functional modules are connected to the first output module 15). Each functional module in the k functional modules may obtain required data from target data received by the input module 14, receive entry data sent by the searching module 11, perform a functional operation based on the data obtained from the input module 14 and the entry data sent by the searching module 11 to implement a service sub-function of a corresponding category, and send an operation result to the first output module 15. The first output module 15 is configured to determine the first functional module 12 and the second functional module 13 based on first control information, and then output a first operation result obtained by performing a first functional operation by the first functional module 12 and a second operation result obtained by performing a second functional operation by the second functional module 13. Optionally, the first control information includes indication information of the first functional module 12 and indication information of the second functional module 13. The first output module 15 is configured to determine the first functional module 12 based on the indication information of the first functional module 12. The first output module 15 is configured to determine the second functional module 13 based on the indication information of the second functional module 13. For example, the first control information is function selection information, and the first control information includes a plurality of indication bits in a one-to-one correspondence with the plurality of functional modules. A value of each indication bit indicates whether a corresponding functional module is selected, and a value of any indication bit may be 1 or 0. "1" indicates that a corresponding functional module is selected (or an operation result of a corresponding functional module is selected), "0" indicates that a corresponding functional module is not selected (or an operation result of a corresponding functional module is not selected). In the first control information, both a value of an indication bit corresponding to the first functional module 12 and a value of an indication bit corresponding to the second functional module 13 may be 1, to indicate that the first functional module 12 and the second functional module 13 are selected. The value "1" of the indication bit corresponding to the first functional module 12 may be the indication information of the first functional module 12, and the value "1" of the indication bit corresponding to the second functional module 13 may be the indication information of the second functional module 13. The first output module 15 determines the first functional module 12 based on the value "1" of the indication bit corresponding to the first functional module 12, and the first output module 15 determines the second functional module 13 based on the value "1" of the indication bit corresponding to the second functional module 13. In an example, the plurality of functional modules are four functional modules, and the function selection information (the first control information) is 4'b0011, where "0011" sequentially corresponds to the functional modules 1 to 4. The first output module 15 may determine the functional module 3 and the functional module 4 based on the function selection information 4'b0011. In another example, the plurality of functional modules are four functional modules, and the function selection information (the first control information) is 4'b1001, where "1001" sequentially corresponds to the functional modules 1 to 4. The first output module 15 may determine the functional module 1 and the functional module 4 based on the function selection information 4'b1001.

In an optional embodiment, a first rule table is configured in the first control module 16, where the first rule table includes at least one service rule, each service rule corresponds to one service function, and each service rule indicates a service sub-function included in a corresponding service function (or indicates a category of a service sub-function included in a corresponding service function). The first control module 16 is configured to: determine a first rule based on type data in the target data and the first rule table; determine the first functional module 12 and the second functional module 13 according to the first rule; and generate the first control information based on the first functional module 12 and the second functional module 13. The first rule table includes the type data and the first rule, the type data represents a service type of a first service function, and service functions of different service types include different service sub-functions. The first rule indicates that the first service function includes a service sub-function of a first category and a service sub-function of a second category. For example, the first rule indicates categories of service sub-functions included in the first service function, to indicate that the first service function includes the service sub-function of the first category and the service sub-function of the second category. For example, the type data is type data A, and the type data indicates that the service type of the first service function is a service type A. The first control module 16 searches the first rule table based on the type data A, and determines a service rule that is in the first rule table and that matches the type data A as the first rule. The first control module 16 determines, according to the first rule, that the first service function includes a service sub-function of the first category and a service sub-function of the second category, and further determines the first functional module 12 configured to implement the service sub-function of the first category and the second functional module 13 configured to implement the service sub-function of the second category.

Still refer to FIG. 5. The data processing apparatus further includes a function supplement module 17. The function supplement module 17 is configured to perform a third functional operation based on second control information and third data in the target data to implement a third service sub-function, where the third service sub-function is a service sub-function in the first service function, the third data is data related to the third service sub-function, and the second control information is determined based on the third data. The third service sub-function is different from the first service sub-function and the second service sub-function, or the third service sub-function is the same as one of the first service sub-function and the second service sub-function. Optionally, the second control information includes indication information of the third data, and the function supplement module 17 is further connected to the input module 14. The function supplement module 17 obtains the target data from the input module 14, and then obtains the third data in the target data based on the indication information of the third data. Alternatively, the function supplement module 17 obtains the third data in the target data from the input module 14 based on the indication information of the third data. For example, the input module 14 includes a data bus, and the indication information of the third data is indication information of a transmission location of the third data in the data bus. For example, the third data is transmitted in a data line corresponding to a third byte of the data bus. The indication information of the third data is the third byte of the data bus.

In an embodiment, the second control information includes a first instruction address, and the function supplement module 17 is configured to: obtain a first instruction based on the first instruction address, and perform a processing operation on the third data by executing the first instruction, where the third functional operation includes the processing operation. The processing operation may be an OR operation, an AND operation, a non-operation, or the like. A specific type of the processing operation may be indicated by the first instruction. The third data may include a plurality of pieces of data. If the processing operation is an OR operation, the function supplement module 17 performs a logical OR operation on the plurality of pieces of data by executing the first instruction. If the processing operation is an AND operation, the function supplement module 17 performs a logical AND operation on the plurality of pieces of data by executing the first instruction. As shown in FIG. 5, the data processing apparatus further includes an instruction storage module 18. The instruction storage module 18 may be an IMEM, and the first instruction is stored in the instruction storage module 18. The function supplement module 17 is configured to obtain the first instruction in the instruction storage module 18 based on the first instruction address. For example, the instruction storage module 18 is configured to store an instruction set. The instruction set includes a plurality of instructions, and the first instruction is one instruction in the instruction set.

In an optional embodiment, the function supplement module 17 includes an ALU array, the ALU array includes a plurality of ALUs, and the plurality of ALUs include a target ALU. The target ALU is configured to: obtain the first instruction based on the first instruction address included in the second control information, obtain the third data in the target data based on the indication information of the third data included in the second control information, and further perform the processing operation on the third data by executing the first instruction. The target ALU may be connected to the instruction storage module 18, and the target ALU obtains the first instruction in the instruction storage module 18 based on the first instruction address. In FIG. 5, an example in which the ALU array is a p×q array is used for description. The ALU array includes p×q ALUs, and the target ALU may be any ALU in the p×q ALUs (for example, the target ALU is ALU11). All the p×q ALUs may be connected to the instruction storage module 18, and all the p×q ALUs may be connected to the input module 14. For brevity in FIG. 5, a connection line between the instruction storage module 18 and the function supplement module 17 indicates that the p×q ALUs are connected to the instruction storage module 18, and a connection line between the input module 14 and the function supplement module 17 indicates that the p×q ALUs are connected to the input module 14. Both p and q are positive integers.

Still refer to FIG. 5, the data processing apparatus further includes a second control module 19, and the second control module 19 is configured to determine the second control information based on the third data. For example, the second control module 19 is configured to determine the second control information based on the third data and third entry data, where the third entry data is determined based on the third data. For example, the second control module 19 is separately connected to the searching module 11 and the input module 14, and the second control module 19 obtains the target data or the third data in the target data from the input module 14. For example, the second control module 19 is configurable. The second control module 19 obtains the third data in the target data based on local configuration information. The searching module 11 is further configured to: obtain the third data in the target data, determine the third entry data based on the third data, and send the third entry data to the second control module 19, so that the second control module 19 determines the second control information based on the third data and the third entry data. In FIG. 5, an example in which the second control module 19 and the first control module 16 are two different control modules is used for description. In an actual implementation, the second control module 19 and the first control module 16 may be a same control module, or may be two different control modules. In an embodiment, a second rule table is configured in the second control module 19, and the second rule table includes at least one control rule. Each control rule includes an instruction address, and may further include data indication information, ALU indication information, and the like. The second control module 19 is configured to: determine a second rule based on the third data and the second rule table, and generate the second control information according to the second rule. The second rule table includes the third data and the second rule, and may further include the third entry data. The second rule includes the first instruction address, and may further include indication information of the target ALU, the indication information of the third data, and the like.

The function supplement module 17 may obtain a third operation result by performing a third functional operation based on the second control information and the third data. The data processing apparatus further includes a second output module, the second output module is connected to the function supplement module 17, and the second output module is configured to output the third operation result. The second output module and the first output module 15 may be a same output module, or may be two different output modules. In FIG. 5, an example in which the second output module and the first output module 15 are a same output module is used for description. The first output module 15 is connected to the function supplement module 17, and the first output module 15 is further configured to output the third operation result. For example, the function supplement module 17 includes an ALU array, the ALU array includes p×q ALUs, and the p×q ALUs are all connected to the first output module 15. For brevity in FIG. 5, a connection line between the function supplement module 17 and the first output module 15 indicates that the p×q ALUs are connected to the first output module 15. For example, if the function supplement module 17 and a functional module simultaneously implement a same service sub-function, the first output module 15 preferentially outputs an operation result that corresponds to the same service sub-function and that is obtained by the function supplement module 17. The first output module 15 may discard an operation result that corresponds to the same service sub-function and that is obtained by the functional module. For example, if the third service sub-function is the same as the first service sub-function, and the third service sub-function is different from the second service sub-function, the first output module 15 outputs the second operation result and the third operation result, and discards the first operation result. If the third service sub-function is the same as the second service sub-function, and the third service sub-function is different from the first service sub-function, the first output module 15 outputs the first operation result and the third operation result, and discards the second operation result. If the third service sub-function is different from the first service sub-function and the second service sub-function, the first output module 15 outputs the first operation result, the second operation result, and the third operation result.

In an optional embodiment of the present disclosure, the first functional module 12 includes a dedicated circuit (for ease of description, the dedicated circuit included in the first functional module 12 is referred to as a first dedicated circuit). The first dedicated circuit is configured to implement a service sub-function of the first category. For example, the first dedicated circuit is configured to perform the first functional operation on the first data and the first entry data to implement the first service sub-function. Optionally, the second functional module 13 also includes a dedicated circuit (for ease of description, the dedicated circuit included in the second functional module 13 is referred to as a second dedicated circuit). The second dedicated circuit is configured to implement a service sub-function of the second category. For example, the second dedicated circuit is configured to perform the second functional operation on the second data and the second entry data to implement the second service sub-function. For example, the data processing apparatus includes k functional modules, the k functional modules are in a one-to-one correspondence with k categories, each functional module in the k functional modules includes a dedicated circuit, and the dedicated circuit included in each functional module is configured to implement a service sub-function of a corresponding category. For example, a functional module 1 includes a dedicated circuit 1, and the dedicated circuit 1 is configured to implement a service sub-function of a category 1. A functional module 2 includes a dedicated circuit 2, and the dedicated circuit 2 is configured to implement a service sub-function of a category 2. A functional module 3 includes a dedicated circuit 3, and the dedicated circuit 3 is configured to implement a service sub-function of a category 3, and so on. In this optional embodiment, a function of each functional module in the k functional modules is fixed, each functional module in the k functional modules may be connected to some data lines included in the input module 14, and a data line connected to each functional module is fixed.

Figure 6:
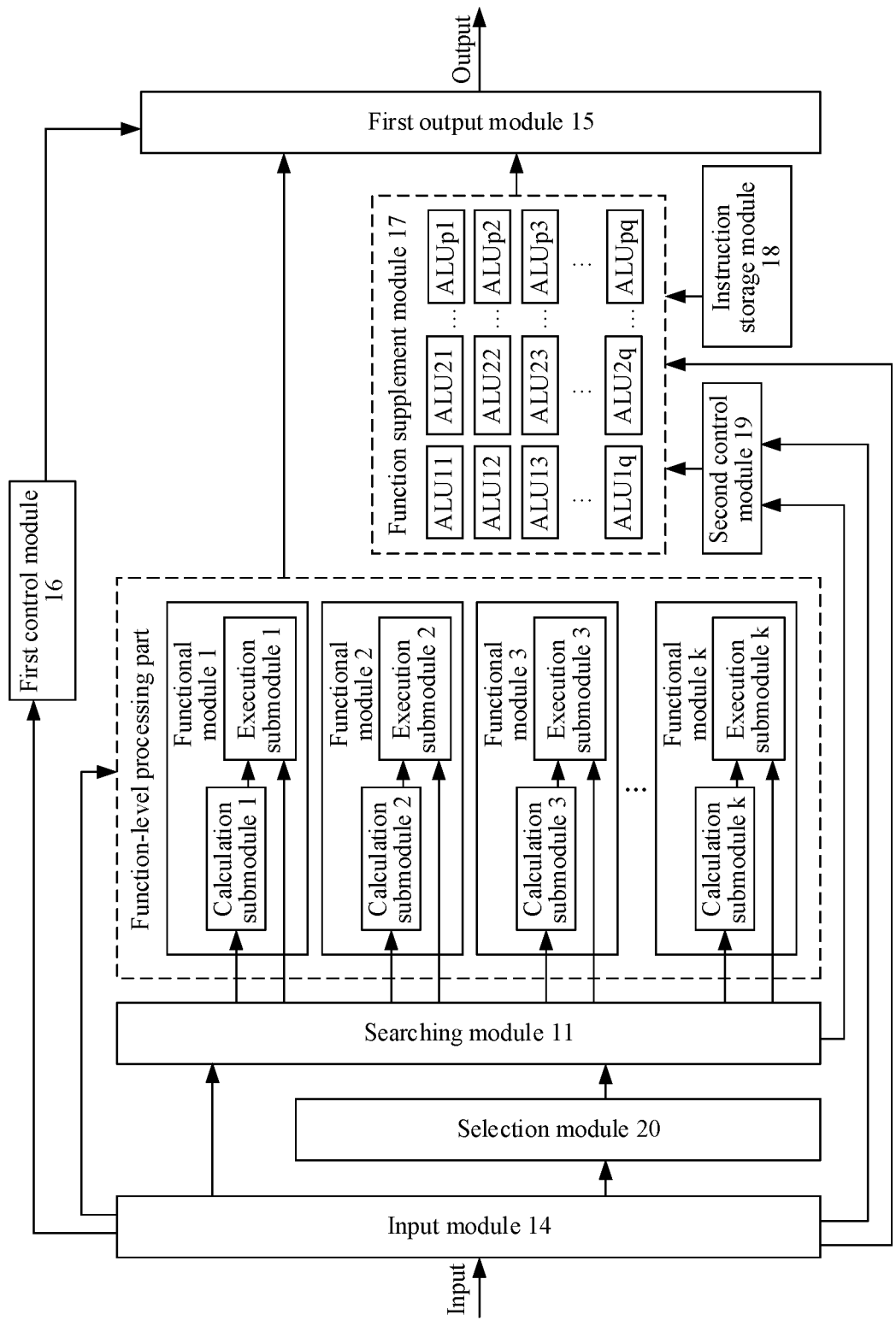
FIG. 6 is a schematic diagram of still another data processing apparatus according to an embodiment of the present disclosure.

In another optional embodiment of the present disclosure, the first functional module 12 includes a calculation submodule and an execution submodule (for ease of description, the calculation submodule included in the first functional module 12 is referred to as a first calculation submodule, and the execution submodule included in the first functional module 12 is referred to as a first execution submodule). The first calculation submodule and the first execution submodule are configured to implement a service sub-function of the first category. For example, at least one of the first data and the first entry data includes control data. The first calculation submodule is configured to determine first execution information based on the control data in the first data and the first entry data. The first execution information indicates to perform the first functional operation. The first execution submodule is configured to perform the first functional operation based on the first execution information. For example, the first execution submodule performs the first functional operation based on the first execution information and non-control data in the first data and the first entry data. Similarly, the second functional module 13 includes a calculation submodule and an execution submodule (for ease of description, the calculation submodule included in the second functional module 13 is referred to as a second calculation submodule, and the execution submodule included in the second functional module 13 is referred to as a second execution submodule). The second calculation submodule and the second execution submodule are configured to implement a service sub-function of the second category. For example, at least one of the second data or the second entry data includes control data. The second calculation submodule is configured to determine second execution information based on the control data in the second data and the second entry data. The second execution information indicates to perform the second functional operation. The second execution submodule is configured to perform the second functional operation based on the second execution information. For example, the second execution submodule performs the second functional operation based on the second execution information and non-control data in the second data and the second entry data. For example, FIG. 6 is a schematic diagram of still another data processing apparatus according to an embodiment of the present disclosure. The data processing apparatus includes k functional modules, and the k functional modules are in a one-to-one correspondence with k categories. Each functional module in the k functional modules includes a calculation submodule and an execution submodule. The calculation submodule and the execution submodule included in each functional module are configured to implement a service sub-function of a corresponding category. For example, a functional module 1 includes a calculation submodule 1 and an execution submodule 1, where the calculation submodule 1 and the execution submodule 1 are configured to implement a service sub-function of a category 1. A functional module 2 includes a calculation submodule 2 and an execution submodule 2, where the calculation submodule 2 and the execution submodule 2 are configured to implement a service sub-function of a category 2. A functional module 3 includes a calculation submodule 3 and an execution submodule 3, where the calculation submodule 3 and the execution submodule 3 are configured to implement a service sub-function of a category 3, and so on. The calculation submodule is configurable. In this optional embodiment, a function of each functional module in the k functional modules is configurable, and each functional module in the k functional modules may be connected to all or some data lines included in the input module 14.

Still refer to FIG. 5 and FIG. 6. The data processing apparatus further includes a selection module 20. The selection module 20 is separately connected to the input module 14 and the searching module 11. A third rule table is configured in the selection module 20. The selection module 20 is configured to obtain fourth data in the target data, and determine a third rule based on the fourth data and the third rule table, where the third rule table includes the fourth data and the third rule, and the third rule includes indication information of the first data. The searching module 11 is further configured to obtain the first data in the target data based on the indication information of the first data. For example, the selection module 20 is configurable. The selection module 20 obtains the fourth data in the target data based on local configuration information. The selection module 20 searches the third rule table based on the fourth data. The selection module 20 determines a rule that is in the third rule table and that matches the fourth data as the third rule. The selection module 20 obtains the indication information that is of the first data and that is included in the third rule, further generates obtaining indication information that includes the indication information of the first data, and sends the obtaining indication information to the searching module 11. The searching module 11 obtains the first data based on the obtaining indication information. For example, the input module 14 includes a data bus, the indication information of the first data may be indication information of a transmission location of the first data in the data bus, and the first data is transmitted in a data line corresponding to a first byte of the data bus. The indication information of the first data may be the first byte of the data bus.

In an embodiment, the third rule further includes indication information of the second data, indication information of the third data, and indication information of the type data, and the searching module 11 is further configured to: obtain the second data in the target data based on the indication information of the second data, obtain the third data in the target data based on the indication information of the third data, and obtain the type data in the target data based on the indication information of the type data. In another embodiment, the selection module 20 is further configured to: obtain fifth data in the target data, and determine a fourth rule based on the fifth data and a fourth rule table, where the fourth rule table includes the fifth data and the fourth rule, and the fourth rule includes the indication information of the second data. The searching module 11 is further configured to obtain the second data in the target data based on the indication information of the second data in the fourth rule. The selection module 20 is further configured to: obtain sixth data in the target data, and determine a fifth rule based on the sixth data and a fifth rule table, where the fifth rule table includes the sixth data and the fifth rule, and the fifth rule includes the indication information of third data. The searching module 11 is further configured to obtain the third data in the target data based on the indication information of the third data in the fifth rule. The selection module 20 is further configured to: obtain seventh data in the target data, and determine a sixth rule based on the seventh data and a sixth rule table, where the sixth rule table includes the seventh data and the sixth rule, and the sixth rule includes the indication information of the type data. The searching module 11 is further configured to obtain the type data in the target data based on the indication information of the type data in the sixth rule. All or some of the third rule table, the fourth rule table, the fifth rule table, and the sixth rule table are a same rule table, and all or some of the fourth rule, the fifth rule, the sixth rule, and the seventh rule are a same rule. This is not limited in this embodiment of the present disclosure.

In an optional embodiment, the data processing apparatus is an MA apparatus, and the MA apparatus includes a match unit and an action unit. The match unit includes the searching module 11, a first control module 16, a second control module 19, and the selection module 20. The action unit includes a first functional module 12, a second functional module 13, a function supplement module 17, and an instruction storage module 18. For example, the match unit includes a match subunit and a branch subunit, the match subunit includes the searching module 11 and the selection module 20, and the branch subunit includes the first control module 16 and the second control module 19. In some embodiments, the match subunit is also referred to as a match part, the branch subunit is also referred to as a branch part, and the searching module 11 may be an input output key builder (IOKB).

In conclusion, according to the data processing apparatus provided in embodiments of the present disclosure, the data processing apparatus includes the first functional module and the second functional module. The first functional module is configured to implement a service sub-function of the first category, and the second functional module is configured to implement a service sub-function of the second category. The first category is different from the second category. To be specific, one functional module can implement a service sub-function of one category. Therefore, compared with a solution in which a plurality of ALUs are used to implement one specific service sub-function, by using the functional modules (for example, the first functional module and the second functional module) provided in embodiments of the present disclosure, structures of the data processing apparatus and the processor can be simplified, resource consumption and costs of the processor can be reduced, a chip area of the processor can be reduced, and performance of the processor can be improved. In the present disclosure, basic functions included in a service function faced by a network are abstracted into service sub-functions of a plurality of categories. A plurality of functional modules in a one-to-one correspondence with the plurality of categories are defined. The plurality of functional modules is used to implement the service sub-functions of the plurality of categories in a one-to-one manner. In this way, structures of the data processing apparatus and the processor can be simplified, and resource consumption and costs of the processor can be reduced. In the present disclosure, the plurality of functional modules parallelized, and then combined through the first output module, to implement free combination of the plurality of functional modules. This can meet requirements of different service functions. The data processing apparatus in the present disclosure further includes a function supplement module. The function supplement module can supplement functions of the function-level processing part, so that the data processing apparatus has a fault tolerance capability and a function expansion capability.

The foregoing describes embodiments of the data processing apparatus in the present disclosure, and the following describes embodiments of a data processing method.

Figure 7:
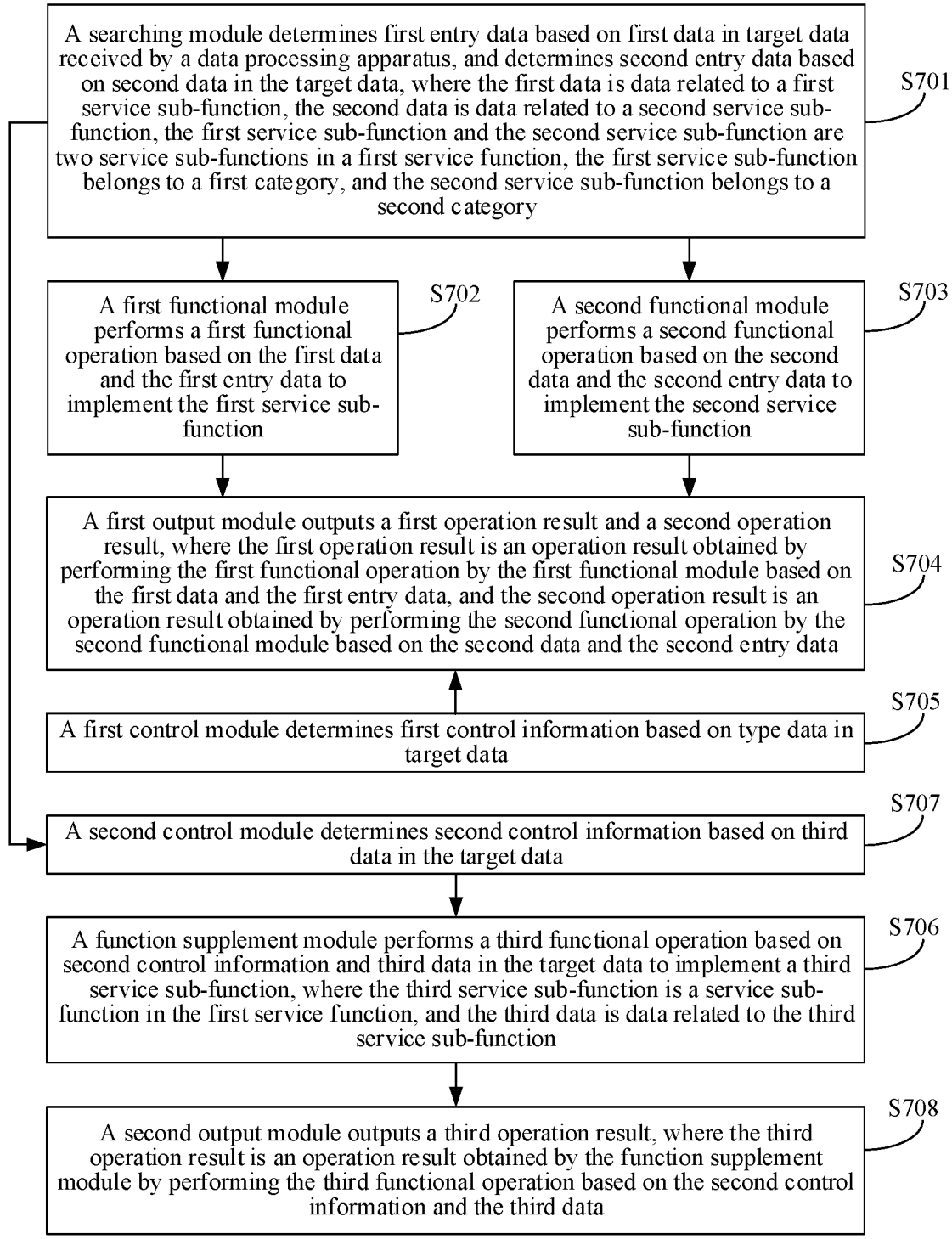
FIG. 7 is a flowchart of a data processing method according to an embodiment of the present disclosure.

FIG. 7 is a flowchart of a data processing method according to an embodiment of the present disclosure. The data processing method is applied to the data processing apparatus shown in any one of FIG. 4 to FIG. 6. The data processing apparatus includes a searching module, a first functional module, and a second functional module. The searching module is separately connected to the first functional module and the second functional module. The first functional module is configured to implement a service sub-function of a first category, and the second functional module is configured to implement a service sub-function of a second category. The first category is different from the second category. As shown in FIG. 7, the data processing method includes the following S701 to S703.

S701: The searching module determines first entry data based on first data in target data received by the data processing apparatus, and determines second entry data based on second data in the target data, where the first data is data related to a first service sub-function, the second data is data related to a second service sub-function, the first service sub-function and the second service sub-function are two service sub-functions in a first service function, the first service sub-function belongs to the first category, and the second service sub-function belongs to the second category.

The target data is data related to a same packet. For example, the target data is data related to a first packet, and the target data includes packet header information of the first packet, related information of an ingress port of the first packet, and the like. The packet header information of the first packet includes but is not limited to a 5-tuple, a source MAC address, a destination MAC address, tunnel information, priority information, service requirement information, a VPN identifier, a VLAN identifier, and the like that are carried in a packet header of the first packet. The ingress port of the first packet is a port through which the network device of the data processing apparatus receives the first packet, and related information of the ingress port includes but is not limited to indication information of the ingress port, configuration information of the ingress port, association information of the ingress port, and the like.

The target data is data received by the data processing apparatus. For example, the data processing apparatus includes an input module, and target data is data received by the input module. For example, the searching module is connected to the input module, and the searching module may obtain the first data and the second data in the target data from the input module. In an embodiment, the data processing apparatus further includes a selection module. The selection module is separately connected to the searching module and the input module. The selection module may obtain fourth data in the target data from the input module. The selection module determines a third rule based on the fourth data and a third rule table. The third rule includes indication information of the first data. The selection module may send the indication information of the first data to the searching module, and the searching module obtains the first data from the input module based on the indication information of the first data. Optionally, the third rule further includes indication information of the second data, the selection module further sends the indication information of the second data to the searching module, and the searching module obtains the second data from the input module based on the indication information of the second data.

The searching module may store a first data table and a second data table. The searching module may search the first data table based on the first data, to determine entry data that is in the first data table and that matches the first data. The searching module determines the entry data that is in the first data table and that matches the first data as the first entry data. The searching module may search the second data table based on the second data, to determine entry data that is in the second data table and that matches the second data. The searching module determines the entry data that is in the second data table and that matches the second data as the second entry data. Optionally, the first data includes one or more pieces of data. The searching module searches the first data table based on all or a part of data included in the first data, to determine the entry data that is in the first data table and that matches the first data. Similarly, the second data includes one or more pieces of data. The searching module searches the second data table based on all or a part of data included in the second data, to determine the entry data that is in the second data table and that matches the second data.

S702: The first functional module performs a first functional operation based on the first data and the first entry data to implement the first service sub-function.

After determining the first entry data, the searching module may send the first entry data to the first functional module, and the first functional module performs the first functional operation based on the first data and the first entry data to implement the first service sub-function. The first data includes one or more pieces of data, the first entry data includes one or more pieces of data, and the first functional module performs the first functional operation based on all or a part of data included in the first data and all or a part of data included in the first entry data.

In an embodiment, the first functional module includes a first dedicated circuit, and the first dedicated circuit is configured to implement a service sub-function of the first category. The first dedicated circuit performs the first functional operation based on the first data and the first entry data.

In another embodiment, the first functional module includes a first calculation submodule and a first execution submodule, where the first calculation submodule is configurable, and the first calculation submodule and the first execution submodule are configured to implement a service sub-function of the first category. At least one of the first data and the first entry data includes control data. The first calculation submodule determines first execution information based on the control data in the first data and the first entry data. The first execution information indicates to perform the first functional operation. The first execution submodule performs the first functional operation based on the first execution information. For example, the first execution submodule performs the first functional operation based on the first execution information and non-control data in the first data and the first entry data.

S703: The second functional module performs a second functional operation based on the second data and the second entry data to implement the second service sub-function.

After determining the second entry data, the searching module may send the second entry data to the second functional module, and the second functional module performs the second functional operation based on the second data and the second entry data to implement the second service sub-function. The second data includes one or more pieces of data, the second entry data includes one or more pieces of data, and the second functional module performs the second functional operation based on all or a part of data included in the second data and all or a part of data included in the second entry data.

In an embodiment, the second functional module includes a second dedicated circuit, and the second dedicated circuit is configured to implement a service sub-function of the second category. The second dedicated circuit performs the second functional operation based on the second data and the second entry data.

In another embodiment, the second functional module includes a second calculation submodule and a second execution submodule, where the second calculation submodule is configurable, and the second calculation submodule and the second execution submodule are configured to implement a service sub-function of the second category. At least one of the second data or the second entry data includes control data. The second calculation submodule determines second execution information based on the control data in the second data and the second entry data. The second execution information indicates to perform the second functional operation. The second execution submodule performs the second functional operation based on the second execution information. For example, the second execution submodule performs the second functional operation based on the second execution information and non-control data in the second data and the second entry data.

In an optional embodiment, the data processing apparatus further includes a first output module, and the first output module is separately connected to the first functional module and the second functional module. After S702 and S703, the data processing method further includes the following S704.

S704: The first output module outputs a first operation result and a second operation result, where the first operation result is an operation result obtained by performing the first functional operation by the first functional module based on the first data and the first entry data, and the second operation result is an operation result obtained by performing the second functional operation by the second functional module based on the second data and the second entry data.

In an embodiment, the first output module outputs the first operation result and the second operation result based on first control information, where the first control information is determined based on type data in the target data, and the type data represents a service type of the first service function.

In an embodiment, the data processing apparatus includes a plurality of functional modules, the plurality of functional modules is in one-to-one correspondence with a plurality of categories, each functional module in the plurality of functional modules is configured to implement a service sub-function of a corresponding category, and the plurality of functional modules include the first functional module and the second functional module. The plurality of functional modules is respectively connected to a searching module, an input module, and a first output module. Each functional module in the plurality of functional modules may obtain required data from target data received by the input module, receive entry data sent by the searching module, perform a functional operation based on the data obtained from the input module and the entry data sent by the searching module to implement a service sub-function of a corresponding category, and send an operation result to the first output module. The first output module may determine the first functional module and the second functional module based on the first control information, and then output the first operation result and the second operation result. For example, the first control information includes indication information of the first functional module and indication information of the second functional module. The first output module determines the first functional module based on the indication information of the first functional module, and the first output module determines the second functional module based on the indication information of the second functional module. The first output module selects, from operation results sent by the plurality of functional modules, the first operation result sent by the first functional module and the second operation result sent by the second functional module, and outputs the first operation result and the second operation result.

In an optional embodiment, the data processing apparatus further includes a first control module, and the first control module is connected to the first output module. Before S704, the data processing method further includes the following S705.

S705: The first control module determines the first control information based on type data in the target data.

The first control module is connected to the input module, and the first control module may obtain the type data in the target data from the input module, and then determine the first control information based on the type data. The type data represents a service type of the first service function. Optionally, a first rule table is configured in the first control module, where the first rule table includes at least one service rule, each service rule corresponds to one service function, and each service rule indicates a service sub-function included in a corresponding service function (or indicates a category of a service sub-function included in a corresponding service function). The first control module determines a first rule based on the type data and a first rule table, determines the first functional module and the second functional module according to the first rule, and then generates the first control information based on the first functional module and the second functional module. The first rule table includes the type data and the first rule, and the first rule indicates that the first service function includes the service sub-function of the first category and the service sub-function of the second category. For example, the first rule indicates categories of service sub-functions included in the first service function, to indicate that the first service function includes the service sub-function of the first category and the service sub-function of the second category.

In an optional embodiment, the data processing apparatus further includes a function supplement module. Still refer to FIG. 7. The data processing method further includes the following S706.

S706: The function supplement module performs a third functional operation based on second control information and third data in the target data to implement a third service sub-function, where the third service sub-function is a service sub-function in the first service function, the third data is data related to the third service sub-function, and the second control information is determined based on the third data.

The third service sub-function is different from the first service sub-function and the second service sub-function, or the third service sub-function is the same as one of the first service sub-function and the second service sub-function. The second control information includes indication information of the third data. The function supplement module may obtain the third data in the target data from the input module based on the indication information of the third data, and then perform the third functional operation based on the second control information and the third data.

In an embodiment, the second control information includes a first instruction address. The function supplement module obtains a first instruction based on the first instruction address. The function supplement module performs a processing operation on the third data by executing the first instruction. The third functional operation includes the processing operation. Optionally, the data processing apparatus further includes an instruction storage module, the first instruction is stored in the instruction storage module, and the function supplement module obtains the first instruction in the instruction storage module based on the first instruction address. For example, the function supplement module includes an ALU array, the ALU array includes a plurality of ALUs, and the plurality of ALUs include a target ALU. The target ALU obtains the first instruction based on the first instruction address (for example, the target ALU obtains the first instruction in the instruction storage module based on the first instruction address). The target ALU performs the processing operation on the third data by executing the first instruction.

In an optional embodiment, the data processing apparatus further includes a second control module, and the second control module is connected to the function supplement module. Before S706, the data processing method further includes the following S707.

S707: The second control module determines the second control information based on the third data.

In an embodiment, the second control module determines a second rule based on the third data and a second rule table, where the second rule table includes the third data and the second rule, and the second rule includes the first instruction address. The second control module generates the second control information according to the second rule. Optionally, the second control module determines the second control information based on the third data and the third entry data. For example, the second control module searches the second rule table based on the third data and the third entry data. The second control module determines a rule that is in the second rule table and that matches the third data and the third entry data as the second rule. The second control module then generates the second control information according to the second rule. The third entry data is entry data determined by the searching module based on the third data. Before S707, the searching module further determines the third entry data based on the third data, and sends the third entry data to the second control module.

In an optional embodiment, the data processing apparatus further includes a second output module, and the second output module is connected to the function supplement module. After S706, the data processing method further includes the following S708.

S708: The second output module outputs a third operation result, where the third operation result is an operation result obtained by the function supplement module by performing the third functional operation based on the second control information and the third data.

After the function supplement module obtains the third operation result, the function supplement module may send the third operation result to the second output module, and the second output module may output the third operation result.

In this embodiment of the present disclosure, the second output module and the first output module may be a same output module, or may be two different output modules. For example, the second output module and the first output module are the same output module (for example, the same output module is the first output module). If the function supplement module and a functional module simultaneously implement a same service sub-function, the first output module preferentially outputs an operation result that corresponds to the same service sub-function and that is obtained by the function supplement module. The first output module may discard an operation result that corresponds to the same service sub-function and that is obtained by the functional module.

In conclusion, according to the data processing method provided in embodiments of the present disclosure, the method is applied to a data processing apparatus in a processor, where the data processing apparatus includes a searching module, a first functional module, and a second functional module. The first functional module is configured to implement a service sub-function of a first category, the second functional module is configured to implement a service sub-function of a second category, and the first category is different from the second category. One functional module can implement a service sub-function of one category. Therefore, in the present disclosure, structures of the data processing apparatus and the processor can be simplified, resource consumption and costs of the processor can be reduced, and performance of the processor can be improved.

An embodiment of the present disclosure further provides a processor. The processor includes the data processing apparatus shown in any one of FIG. 4 to FIG. 6. One functional module of the data processing apparatus can implement a service sub-function of one category. Therefore, structures of the data processing apparatus and the processor can be simplified, resource consumption and costs of the processor can be reduced, and performance of the processor can be improved.

Optionally, the processor is a programmable processor. The processor includes a programmable logic circuit and/or program instructions. During running, the processor is configured to implement the method according to the second aspect or any one of the optional manners of the second aspect.

Optionally, the processor is a network processor (NP).

The processor may be a processor chip. For example, the processor is any possible processor chip such as an ASIC chip, an FPGA chip, an NP chip, or a GAL chip.

An embodiment of the present disclosure further provides a network device. The network device includes the foregoing processor. The network device may be any network device used for service forwarding in a communication network. For example, according to a device type, the network device may be a switch, a router, or the like. According to a device deployment location, the network device may be an edge network device, a core network device, or a network device in a data center. For example, the edge network device may be a provider edge (PE) device, and the core network device may be a provider (P) device.

Figure 8:
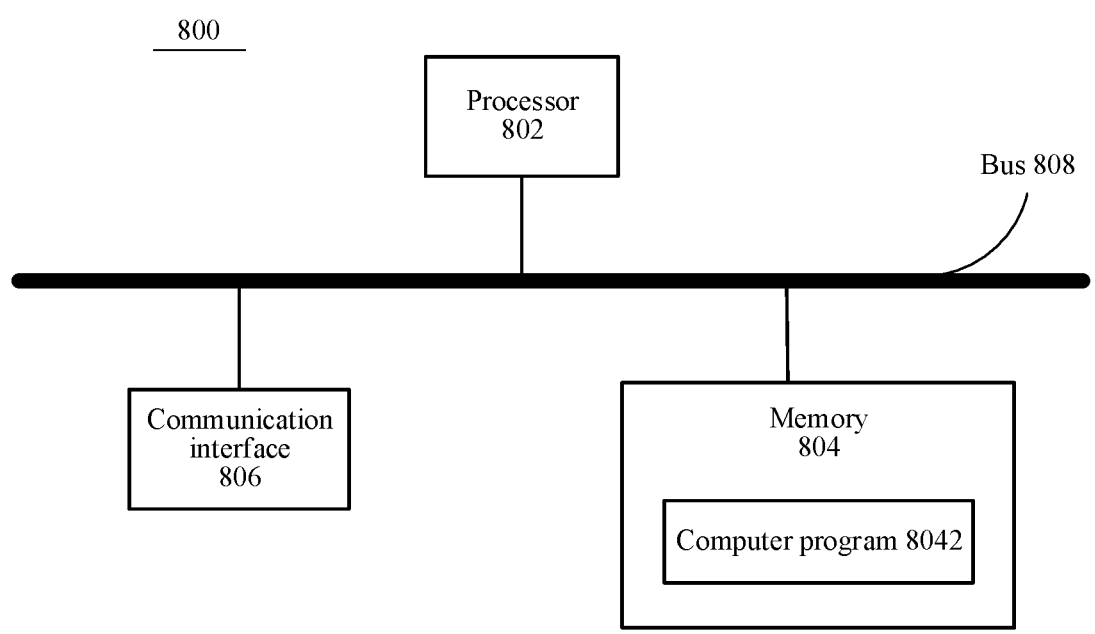
FIG. 8 is a schematic diagram of a network device according to an embodiment of the present disclosure.

In an example, FIG. 8 is a schematic diagram of a network device 800 according to an embodiment of the present disclosure. The network device 800 includes a processor 802, a memory 804, a communication interface 806, and a bus 808. The processor 802, the memory 804, and the communication interface 806 are communicatively connected to each other through the bus 808. A connection manner between the processor 802, the memory 804, and the communication interface 806 shown in FIG. 8 is merely an example. In an implementation process, the processor 802, the memory 804, and the communication interface 806 may alternatively be communicatively connected to each other in another connection manner other than the bus 808.

The memory 804 may be configured to store a computer program 8042, and the computer program 8042 may include instructions and data. The memory 804 may be various types of storage media, for example, a random-access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register.

The processor 802 may be a programmable processor, and the processor 802 includes the data processing apparatus shown in any one of FIG. 4 to FIG. 6. The processor 802 may be a general-purpose processor, and the general-purpose processor may perform specific steps and/or operations by reading and executing a computer program (for example, the computer program 8042) stored in a memory (for example, the memory 804). The general-purpose processor may use the data stored in the memory in a process of performing the steps and/or operations. The general-purpose processor is, for example, but not limited to, a central processing unit (CPU). Alternatively, the processor 802 may be a dedicated processor. The dedicated processor is a processor specially designed to perform a specific step and/or operation. The dedicated processor is, for example, but not limited to, an NP, an ASIC, an FPGA, or a GAL. The processor 802 may alternatively be a combination of a plurality of processors, for example, a multi-core processor.

The communication interface 806 may include an interface that is used to implement interconnection between components inside the network device 800, such as an input/output (I/O) interface, a physical interface, and a logical interface, and an interface that is used to implement interconnection between the network device 800 and another device (for example, a network device). The physical interface may be a gigabit Ethernet (GE) interface, and may be configured to implement interconnection between the network device 800 and another device. The logical interface is an interface inside the network device 800, and may be configured to implement interconnection between components inside the network device 800. The communication interface 806 may be used by the network device 800 to communicate with another device. For example, the communication interface 806 is configured to send and receive a packet between the network device 800 and another device.

The bus 808 may be any type of a communication bus, for example, a system bus configured to implement interconnection between the processor 802, the memory 804, and the communication interface 806. The bus 808 may include a data bus, an address bus, a control bus, and the like.

The processor 802, the memory 804, and the communication interface 806 may be integrated on a same chip, or the processor 802, the memory 804, and the communication interface 806 may be separately disposed on chips independent of each other, or may be at least partially or completely disposed on a same chip. Whether the components are independently disposed on different chips or integratedly disposed on one or more chips often depends on a product design requirement. A specific implementation form of the foregoing components is not limited in the present disclosure.

The network device 800 shown in FIG. 8 is merely an example. In an implementation process, the network device 800 may further include other components, which are not listed one by one in this specification.

All or a part of the foregoing embodiments may be implemented by software, hardware, firmware, or any combination thereof. When the embodiments are implemented by using the software, all or some of the embodiments can be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that, the term "at least one" in the present disclosure refers to one or more, and the term "plurality of" refers to two or more. In the present disclosure, unless otherwise specified, the symbol "/" generally represents "or". For example, A/B may represent A or B. The term "and/or" in the present disclosure is merely an association relationship for describing associated objects, and indicates that three relationships may exist. For example, A and/or B may indicate: only A exists, both A and B exist, and only B exists. In addition, for ease of clear description, in the present disclosure, terms such as "first", "second", and "third" are used to distinguish between same items or similar items with basically same functions and purposes. A person skilled in the art may understand that the terms "first", "second", and "third" do not limit a quantity or an execution sequence.

For various embodiments such as the method embodiments and the apparatus embodiments provided in embodiments of the present disclosure, reference may be made to each other. This is not limited in embodiments of the present disclosure. A sequence of operations in the method embodiments provided in embodiments of the present disclosure can be properly adjusted, and operations can also be increased or decreased based on a situation. Any variation of the method readily figured out by a person skilled in the art within the technical scope disclosed in the present disclosure shall fall within the protection scope of the present disclosure. Therefore, details are not described again.

In the corresponding embodiments provided in the present disclosure, it should be understood that, the disclosed apparatus and the like may be implemented in other structural manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts described as units may or may not be physical units, may be located in one position, or may be distributed on a plurality of network nodes. Some or all of the units may be selected based on actual requirements to achieve the objectives of the solutions of embodiments.

The foregoing descriptions are merely example implementations of the present disclosure, but are not intended to limit the protection scope of the present disclosure. Various equivalent modifications or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A processor comprising:
    a data processing apparatus configured to receive target data, wherein the data processing apparatus comprises:
       a search component configured to:
          determine first entry data based on first data in the target data, wherein the first data is related to a first service sub-function, and wherein the first service sub-function belongs to a first category; and
          determine second entry data based on second data in the target data, wherein the second data is related to a second service sub-function, wherein the first service sub-function and the second service sub-function are in a first service function, wherein the second service sub-function belongs to a second category, and wherein the first category is different from the second category;
       a first functional component configured to perform a first functional operation, based on the first data and the first entry data, to implement the first service sub-function;
       a second functional component configured to perform a second functional operation, based on the second data and the second entry data, to implement the second service sub-function; and
       a function supplement component configured to perform a third functional operation, based on first control information and third data in the target data, to implement a third service sub-function, wherein the third service sub-function is a third service sub-function in the first service function, wherein the third data is related to the third service sub-function, and wherein the first control information is based on the third data.

2. The processor of claim 1, wherein the first functional component is further configured to further perform the first functional operation based on the first data and the first entry data to obtain a first operation result, wherein the second functional component is further configured to further perform the second functional operation based on the second data and the second entry data to obtain a second operation result, and wherein the data processing apparatus further comprises a first output component configured to output the first operation result and the second operation result.

3. The processor of claim 2, wherein the first output component is further configured to further output the first operation result and the second operation result based on second control information, wherein the second control information is based on type data in the target data, and wherein the type data represents a service type of the first service function.

4. The processor of claim 3, further comprising a plurality of functional components, wherein the plurality of functional components is in a one-to-one correspondence with a plurality of categories, wherein each functional component in the plurality of functional components is configured to implement a service sub-function of a corresponding category, wherein the plurality of functional components comprise the first functional component and the second functional component, and wherein the first output component is further configured to:
    determine the first functional component and the second functional component based on the second control information;
    output the first operation result based on the first functional component; and
    output the second operation result based on the second functional component.

5. The processor of claim 3, further comprising a first control component configured to determine the second control information based on the type data.

6. The processor of claim 5, wherein the first control component is further configured to:
    determine a first rule based on the type data and a first rule table, wherein the first rule indicates that the first service function comprises the first service sub-function of the first category and the second service sub-function of the second category;
    determine the first functional component and the second functional component according to the first rule; and
    generate the second control information based on the first functional component and the second functional component.

7. The processor of claim 5, wherein the first control component comprises a ternary content-addressable memory (TCAM).

8. The processor of claim 1, wherein the first control information comprises a first instruction address, and wherein the function supplement component is further configured to:
    obtain a first instruction based on the first instruction address; and
    perform a processing operation on the third data by executing the first instruction, wherein the third functional operation comprises the processing operation.

9. The processor of claim 8, wherein the function supplement component comprises an arithmetic logic unit (ALU)

array comprising a plurality of ALUs, wherein the plurality of ALUs comprise a target ALU, and wherein the target ALU is configured to:
   obtain the first instruction based on the first instruction address; and
   perform the processing operation on the third data by executing the first instruction.

10. The processor of claim 8, further comprising an instruction storage component configured to store the first instruction, wherein the function supplement component is further configured to obtain the first instruction in the instruction storage component based on the first instruction address.

11. The processor of claim 1, further comprising a second control component configured to determine the first control information based on the third data.

12. The processor of claim 11, wherein the searching component is further configured to determine third entry data based on the third data, and wherein the second control component is configured to determine the first control information based on the third data and the third entry data.

13. The processor of claim 11, wherein the second control component is further configured to:
   determine a second rule based on the third data and a second rule table, wherein the second rule comprises a first instruction address; and
   generate the first control information according to the second rule.

14. The processor of claim 11, wherein the second control component comprises a ternary content-addressable memory (TCAM).

15. The processor of claim 1, wherein the function supplement component is further configured to further perform the third functional operation, based on the first control information and the third data, to obtain a third operation result, and wherein the data processing apparatus further comprises a second output component configured to output the third operation result.

16. The data processing apparatus of claim 1, wherein the first functional component comprises a dedicated circuit configured to implement the first service sub-function of the first category.

17. The processor of claim 1, wherein the second functional component comprises a calculation subcomponent and an execution subcomponent, and wherein the calculation subcomponent and the execution subcomponent are configured to jointly implement the second service sub-function of the second category.

18. The processor of claim 17, wherein at least one of the second data or the second entry data comprises control data, wherein the calculation subcomponent is further configured to determine execution information based on the control data in the second data and the second entry data, wherein the execution information indicates to the execution subcomponent to perform the second functional operation, and wherein the execution subcomponent is further configured to perform the second functional operation based on the execution information.

19. The processor of claim 1, further comprising a selection component configured to determine a third rule based on a third rule table and fourth data in the target data, wherein the third rule comprises indication information of the first data, and wherein the searching component is further configured to obtain the first data based on the indication information of the first data.

20. The processor of claim 1, wherein the target data is related to a same packet.

21. The processor of claim 1, wherein the data processing apparatus is a match action (MA) apparatus comprising a match unit and an action unit, wherein the match unit comprises the searching component, and wherein the action unit comprises the first functional component and the second functional component.

22. A method, implemented by a processor comprising a data processing apparatus, wherein the method comprises:
   receiving target data by the data processing apparatus;
   determining, by a searching component of the data processing apparatus, first entry data and second entry data, wherein the first entry data is based on first data in the target data, wherein the second entry data is based on second data in the target data, wherein the first data is related to a first service sub-function, wherein the second data is related to a second service sub-function, wherein the first service sub-function and the second service sub-function are in a first service function, wherein the first service sub-function belongs to a first category, and wherein the second service sub-function belongs to a second category;
   performing, by a first functional component of the data processing apparatus, a first functional operation based on the first data and the first entry data to implement the first service sub-function;
   performing, by a second functional component of the data processing apparatus, a second functional operation based on the second data and the second entry data to implement the second service sub-function; and
   performing, by a function supplement component of the data processing apparatus, a third functional operation based on first control information and third data in the target data to implement a third service sub-function, wherein the third service sub-function is a service sub-function in the first service function, wherein the third data is data related to the third service sub-function, and wherein the first control information is determined based on the third data.

23. The method of claim 22, further comprising:
   performing, by the first functional component, the first functional operation based on the first data and the first entry data to obtain a first operation result;
   performing, by the second functional component, the second functional operation based on the second data and the second entry data to obtain a second operation result; and
   outputting, by a first output component of the data processing apparatus, the first operation result and the second operation result.

24. The method of claim 23, further comprising:
   further outputting, by the first output component, the first operation result and the second operation result based on second control information, wherein the second control information is based on type data in the target data, and wherein the type data represents a service type of the first service function.

25. The method of claim 24, further comprising:
   determining, by the first output component, the first functional component and the second functional component based on the second control information;
   outputting, by the first output component, the first operation result based on the first functional component; and
   outputting, by the first output component, the second operation result based on the second functional component.

26. The method of claim 24, further comprising determining, by a first control component, the second control information based on the type data.

27. The method of claim 26, further comprising:
determining, by the first control component, a first rule based on the type data and a first rule table, wherein the first rule indicates that the first service function comprises the first service sub-function of the first category and the second service sub-function of the second category;
determining, by the first control component, the first functional component and the second functional component according to the first rule; and
generating, by the first control component, the second control information based on the first functional component and the second functional component.

28. The method of claim 22, wherein the second control information first control information comprises a first instruction address, and wherein the method further comprises:
obtaining, by the function supplement component, a first instruction based on the first instruction address; and
performing, by the function supplement component, a processing operation on the third data by executing the first instruction, wherein the third functional operation comprises the processing operation.

29. The method of claim 22, further comprising determining the first control information based on the third data.

30. The method of claim 29, wherein determining the first control information based on the third data comprises:
determining third entry data based on the third data; and
determining the first control information based on the third data and the third entry data.

* * * * *

UNITED STATES PATENT AND TRADEMARK OFFICE
CERTIFICATE OF CORRECTION

| | |
|---|---|
| PATENT NO. | : 12,423,098 B2 |
| APPLICATION NO. | : 18/483231 |
| DATED | : September 23, 2025 |
| INVENTOR(S) | : Taixu Tian, Weihua Li and Shunfang Li |

It is certified that error appears in the above-identified patent and that said Letters Patent is hereby corrected as shown below:

In the Claims

Claim 28, Column 38, Lines 1-2: "The method of claim 22, wherein the second control information first control information comprises a first" should read "The method of claim 22, wherein the first control information comprises a first"

Signed and Sealed this
Twenty-eighth Day of October, 2025

John A. Squires
*Director of the United States Patent and Trademark Office*